United States Patent
Shin et al.

(10) Patent No.: US 12,041,188 B2
(45) Date of Patent: Jul. 16, 2024

(54) SECURITY DEVICE INCLUDING PHYSICAL UNCLONABLE FUNCTION CELLS AND OPERATION METHOD THEREOF

(71) Applicant: Samsung Electronics Co., Ltd., Suwon-si (KR)

(72) Inventors: Hoyoung Shin, Gunpo-si (KR); Sung Ung Kwak, Suwon-si (KR); Ji-Sung Kim, Seoul (KR); Shin-Wuk Kang, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 343 days.

(21) Appl. No.: 17/394,613

(22) Filed: Aug. 5, 2021

(65) Prior Publication Data
US 2022/0045873 A1    Feb. 10, 2022

(30) Foreign Application Priority Data
Aug. 6, 2020    (KR) .......................... 10-2020-0098799

(51) Int. Cl.
*H04L 29/00* (2006.01)
*G11C 7/06* (2006.01)
(Continued)

(52) U.S. Cl.
CPC .............. *H04L 9/3278* (2013.01); *G11C 7/06* (2013.01); *G11C 8/10* (2013.01); *H03M 1/662* (2013.01); *H04L 9/0866* (2013.01)

(58) Field of Classification Search
CPC ........ G06F 21/72; G06F 21/107; G06F 21/73; H04L 9/3278; H04L 9/0866;
(Continued)

(56) References Cited

U.S. PATENT DOCUMENTS 5,675,546 A * 10/1997 Leung .................... G11C 29/16
365/201
8,619,979 B2   12/2013 Ficke et al.
(Continued)

FOREIGN PATENT DOCUMENTS

| CN | 105184191 A | * 12/2015 | |
|---|---|---|---|
| KR | 10-1359783 B1 | 2/2014 | |
| WO | WO-2015105687 A1 | * 7/2015 | ........... G06F 21/604 |

*Primary Examiner* — Don G Zhao
(74) *Attorney, Agent, or Firm* — Harness, Dickey & Pierce, P.L.C.

(57) ABSTRACT

A security device includes a physical unclonable function (PUF) cell array including PUF cells connected with word lines and bit lines; first decoder circuitry connecting a first bit line connected to a target PUF cell with a first data line and a second bit line connected with a reference PUF cell to a second data line; a digital-to-analog converter (DAC) control circuit outputting first and second digital codes; a first DAC between a power supply voltage and the first data line, the first DAC generating a first analog output in response to the first digital code; a second DAC between the power supply voltage and the second data line, the second DAC generating a second analog output in response to the second digital code; and a sense amplifier comparing the first analog output and the second analog output and outputting a comparison result.

17 Claims, 22 Drawing Sheets

(51) Int. Cl.
*G11C 8/10* (2006.01)
*H03M 1/66* (2006.01)
*H04L 9/08* (2006.01)
*H04L 9/32* (2006.01)

(58) Field of Classification Search
CPC ....... H04L 2209/12; G11C 29/50; G11C 8/10; G11C 7/06; G11C 2029/4402; G11C 2029/5002; G11C 7/12; G11C 7/16; G11C 8/08; H03M 1/662; H03M 1/765; H03M 1/66
See application file for complete search history.

(56) References Cited

U.S. PATENT DOCUMENTS

| | | | |
|---|---|---|---|
| 9,083,323 | B2 | 7/2015 | Guo et al. |
| 9,105,432 | B2 | 8/2015 | Kim et al. |
| 9,916,884 | B2 | 3/2018 | Augustine et al. |
| 9,934,411 | B2 * | 4/2018 | Kwong .................... G09C 1/00 |
| 10,103,733 | B1 * | 10/2018 | Gurrieri ........... H03K 19/00315 |
| 10,218,517 | B2 * | 2/2019 | Mai ....................... H04L 9/3278 |
| 10,243,749 | B2 * | 3/2019 | Park ....................... G11C 29/44 |
| 10,311,930 | B1 * | 6/2019 | Kim ....................... H04L 9/3278 |
| 10,439,613 | B2 | 10/2019 | Karpinskyy et al. |
| 10,468,104 | B1 * | 11/2019 | Anand .................... H04L 9/3278 |
| 10,505,728 | B2 | 12/2019 | Lee et al. |
| 10,560,095 | B2 | 2/2020 | O'Dwyer et al. |
| 10,574,469 | B1 * | 2/2020 | Garni .................... G11C 11/419 |
| 10,803,942 | B1 * | 10/2020 | Jung ..................... H04L 9/3278 |
| 10,872,010 | B2 * | 12/2020 | Mondello ............... G06F 21/79 |
| 11,233,663 | B1 * | 1/2022 | Hoefler ................. H04L 9/0866 |
| 2018/0076957 | A1 * | 3/2018 | Watanabe ............. G06F 21/602 |
| 2018/0159685 | A1 * | 6/2018 | Kwak .................... H04L 9/0866 |
| 2018/0337793 | A1 * | 11/2018 | Park ....................... H03K 19/003 |
| 2018/0349100 | A1 | 12/2018 | Plusquellic |
| 2019/0026724 | A1 * | 1/2019 | Wade ..................... G07F 7/1016 |
| 2019/0165938 | A1 | 5/2019 | Lu et al. |
| 2019/0229933 | A1 | 7/2019 | Li et al. |
| 2019/0304527 | A1 * | 10/2019 | Kim ....................... H10N 50/10 |
| 2019/0342104 | A1 | 11/2019 | Adams et al. |
| 2019/0342106 | A1 * | 11/2019 | Li ............................. G11C 7/24 |
| 2020/0014547 | A1 * | 1/2020 | Lu ......................... H04L 9/0866 |
| 2020/0106625 | A1 * | 4/2020 | Shen ........................ H03K 5/13 |
| 2021/0027814 | A1 * | 1/2021 | Mahatme ............. H04L 9/0866 |
| 2021/0328817 | A1 * | 10/2021 | Sonntag .................. G11C 7/12 |
| 2021/0391013 | A1 * | 12/2021 | Tan ........................... G11C 7/04 |

* cited by examiner

SECURITY DEVICE INCLUDING PHYSICAL UNCLONABLE FUNCTION CELLS AND OPERATION METHOD THEREOF

CROSS-REFERENCE TO RELATED APPLICATIONS

This application claims priority under 35 U.S.C. § 119 to Korean Patent Application No. 10-2020-0098799 filed on Aug. 6, 2020, in the Korean Intellectual Property Office, the disclosures of which are incorporated by reference herein in their entireties.

BACKGROUND

Example embodiments of the inventive concepts described herein relate to a security device, and more particularly, relate to a security device including physical unclonable function (PUF) cells and an operation method thereof.

In technologies for mobile devices and communication technology, technology associated with security and encryption becomes important. Because a key generated in a software manner may be leaked out through hacking and/or spoofing, nowadays, hardware-based security manners are being developed.

For example, semiconductor devices having a physical unclonable function (PUF) are being developed. The PUF refers to a function and/or a device that generates a unique key (e.g., a digital fingerprint and/or response) randomly depending on process, voltage, and/or temperature (PVT) variations (e.g., a challenge) in a semiconductor device. In general, a unique key generated from the PUF may include a random characteristic and an iterative characteristic. However, because the PUF generates a random key based on the PVT variations, an error may occur at a key due to various environment factors, thereby causing a reduction of reliability of a semiconductor device and/or a security device having the PUF.

SUMMARY

Some example embodiments of the inventive concepts provide a security device including physical unclonable function (PUF) cells and having improved reliability and reduced circuit complexity and an operation method thereof.

According to some example embodiments, a security device includes a physical unclonable function (PUF) cell array that includes a plurality of PUF cells connected with a plurality of word lines and a plurality of bit lines, first decoder circuitry configured to connect, from the plurality of bit lines, a first bit line connected to a target PUF cell with a first data line and to connect a second bit line connected to a reference PUF cell with a second data line; a digital-to-analog converter (DAC) control circuit configured to output a first digital code and a second digital code; a first digital-to-analog converter between a power supply voltage and the first data line, the first digital-to-analog converter configured to generate a first analog output in response to the first digital code; a second digital-to-analog converter between the power supply voltage and the second data line, the second digital-to-analog converter configured to generate a second analog output in response to the second digital code; and a sense amplifier configured to compare the first analog output and the second analog output and output the comparison result.

According to some example embodiments, a security device includes a physical unclonable function (PUF) cell array that includes a plurality of PUF cells connected with a plurality of word lines and a plurality of bit lines, first decoder circuitry configured to connect a first bit line, of the plurality of bit lines, connected to a target PUF cell with a first data line and to connect a second bit line, of the plurality of bit lines, connected to a reference PUF cell to a second data line; a digital-to-analog converter (DAC) control circuit configured to output a digital code; a digital-to-analog converter between a power supply voltage and the first data line, the a digital-to-analog converter configured to generate a first analog output in response to the digital code; a reference resistor circuit between the power supply voltage and the second data line, the reference resistor circuit configured to output a second analog output; and a sense amplifier configured to compare the first analog output and the second analog and to output the comparison result.

According to some example embodiment, an operation method of a security device which includes a plurality of physical unclonable function (PUF) cells includes connecting a target PUF cell of the plurality of PUF cells with a first data line; connecting a reference PUF cell of the plurality of PUF cells with a second data line; setting a first digital code and a second digital code to an initial value, comparing a first analog output and a second analog output, wherein the first analog output is a voltage obtained by diving a first voltage range based on the first digital code, the first voltage range being derived from a voltage of the first data line to the power supply voltage, and the second analog output indicates a voltage obtained by dividing a second voltage range based on the second digital code, the second voltage range being derived from a voltage of the second data line to the power supply voltage; adjusting one digital code of the first digital code or the second digital code based on a result of the comparison, determining a mismatch value of the target PUF cell based on the one adjusted digital code from among the first digital code and the second digital code, determining whether the target PUF cell is a weak cell, based on the mismatch value, and storing an address corresponding to the target PUF cell when the target PUF cell is determined as the weak cell.

BRIEF DESCRIPTION OF THE FIGURES

The above and other objects and features of the inventive concepts will become apparent by describing in detail some example embodiments thereof with reference to the accompanying drawings.

DETAILED DESCRIPTION

Figure 1:
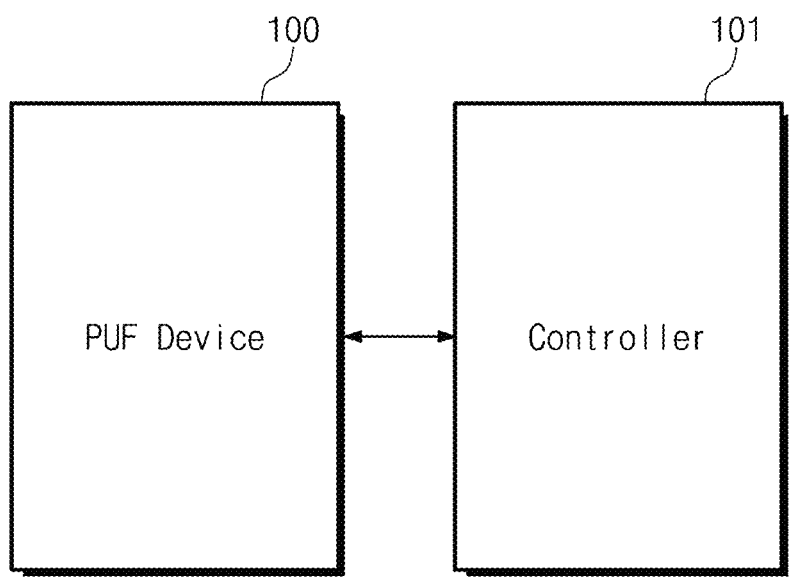
FIG. 1 is a block diagram illustrating a security device according to some example embodiments of the inventive concepts.

Below, some example embodiments of the inventive concepts may be described in detail with reference to the accompanying drawings to aid in clearly explaining the present inventive concepts.

Components described in the detailed description with reference to terms "part," "unit," "module," "layer," etc. and/or function blocks illustrated in drawings may be implemented in the form of software, hardware, and/or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, and/or a combination thereof.

Also, unless differently defined, all terms used herein, which include technical terminologies or scientific terminologies, have the same meaning as that understood by a person skilled in the art to which the inventive concepts belongs. Terms defined in a generally used dictionary are to be interpreted to have meanings equal to the contextual meanings in a relevant technical field, and are not interpreted to have ideal or excessively formal meanings unless clearly defined in the specification.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another element, component, region, layer, or section. Thus, a first element, component, region, layer, or section, discussed below may be termed a second element, component, region, layer, or section, without departing from the scope of this disclosure.

When the terms "about" or "substantially" are used in this specification in connection with a numerical value, it is intended that the associated numerical value includes a manufacturing tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

Below, to describe the inventive concepts, a number of some components and numerical values are provided, but the inventive concepts are not limited thereto. For example, in the accompanying drawings and description below, for brevity of illustration, some example embodiments are illustrated as including eight PUF cells connected with word lines. However, this example is for describing the inventive concepts easily, and it may be well understood that the inventive concepts are not limited thereto.

FIG. 1 is a block diagram illustrating a security device according to some example embodiments of the inventive concepts. Referring to FIG. 1, a security device 10 may include a physical unclonable function (PUF) device 100 and a controller 101. The security device 10 may be configured to generate a random key under the control of an external device (e.g., a central processing unit (CPU) and/or an application processor (AP)) or in response to a request from the external device.

The PUF device 100 may include a plurality of PUF cells. The plurality of PUF cells may be arranged in an array. In some example embodiments, each of the plurality of PUF cells may include at least one of various kinds of PUF cells such as a PUF cell based on a threshold voltage of a transistor, an arbiter-based PUF cell (e.g., a feed-forward PUF cell, an XOR PUF cell in which arbiter PUF cells are arranged in parallel, and/or a lightweight PUF cell), a ring oscillator-based PUF cell, a memory-based PUF cell (e.g., a static random access memory (SRAM) PUF cell, a latch PUF cell, a flash memory PUF cell, and/or a memristor PUF cell), and/or a PUF cell reconfigurable according to a laser beam and/or a thermal variation. Each of the plurality of PUF cells may include the same kind of PUF cell, a different kind of PUF, and/or a combination thereof. Below, for brevity and clarity, each of the plurality of PUF cells is described as a PUF cell based on a threshold voltage of a transistor. However, the inventive concepts are not limited thereto. For example, as noted above, each of the plurality of PUF cells may be implemented with various types of PUF cells.

The controller 101 may be configured to control the PUF device 100. For example, the controller 101 may provide the PUF device 100 with various control signals for controlling the PUF device 100. The controller 101 may generate a random key based on information (e.g., a target bit) received from the PUF device 100.

In some example embodiments, the PUF device 100 and the controller 101 may be implemented with one semiconductor chip or one semiconductor package.

Alternatively, each of the PUF device 100 and the controller 101 may be implemented with a separate semiconductor chip or a separate semiconductor package.

Figure 2:
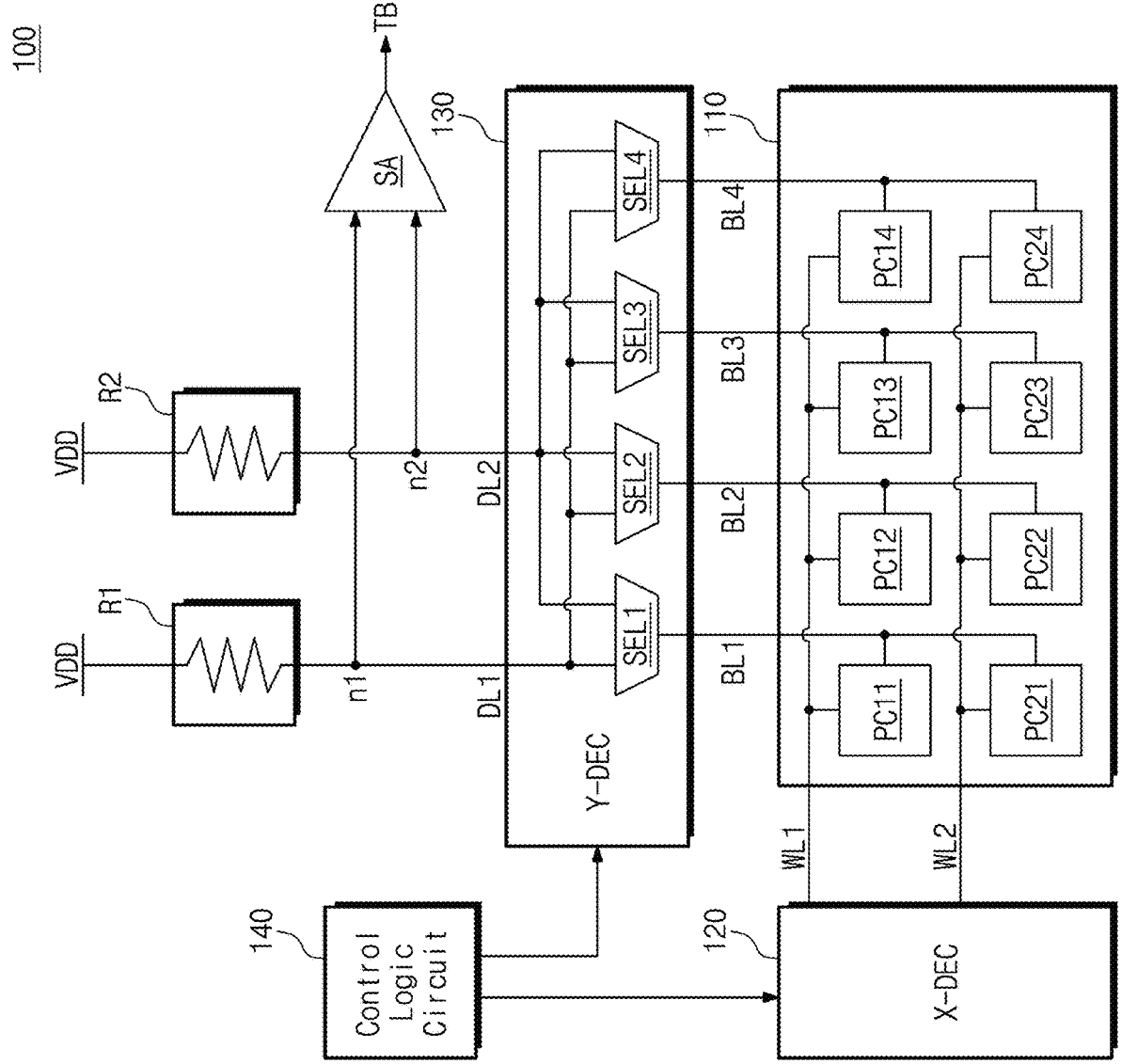
FIG. 2 is a block diagram illustrating a PUF device of FIG. 1.

FIG. 2 is a block diagram illustrating a PUF device of FIG. 1. Referring to FIGS. 1 and 2, the PUF device 100 may include a PUF cell array 110, an X-decoder 120, a Y-decoder 130, a control logic circuit 140, a sense amplifier SA, a first reference resistor circuit R1, and a second reference resistor circuit R2.

The PUF cell array 110 may include a plurality of PUF cells PC11 to PC24.

The plurality of PUF cells PC11 to PC24 may be arranged in an array and may be connected with a plurality of word lines (e.g., WL1 and WL2) and a plurality of bit lines (e.g., BL1 to BL4). For brevity of drawing and convenience of description, a structure in which the plurality of PUF cells PC11 to PC24 are connected with two word lines WL1 and WL2 and four bit lines BL1 to BL4 (e.g., a 2×4 structure) is illustrated, but the inventive concepts are not limited thereto. For example, the number of PUF cells included in the PUF cell array 110, the number of word lines, and/or the number of bit lines may be increased and/or decreased.

The X-decoder 120 may be connected with the PUF cell array 110 through the plurality of word lines WL1 and WL2. The X-decoder 120 may control voltages of the plurality of word lines WL1 and WL2 under the control of the control logic circuit 140. For example, the X-decoder 120 may, under the control of the control logic circuit 140, apply an active voltage to a word line connected with a target PUF cell. In some example embodiments, the active voltage may be a voltage for activating an element included in a target PUF cell.

The Y-decoder 130 may be connected with the PUF cell array 110 through the plurality of bit lines BL1 to BL4. Under the control of the control logic circuit 140, the Y-decoder 130 may control a connection between at least a part of the plurality of bit lines BL1 to BL4 with a first data line DL1 and/or a second data line DL2. For example, the Y-decoder 130 may include a plurality of selectors SEL1 to SEL4. The plurality of selectors SEL1 to SEL4 may be connected with the plurality of bit lines BL1 to BL4, respectively. Each of the plurality of selectors SEL1 to SEL4 may be connected with the first data line DL1 and the second data line DL2. For example, one of the first data line DL1 and the second data line DL2 may include a target line, and the other may include a reference line.

Under the control of the control logic circuit 140, each of the plurality of selectors SEL1 to SEL4 may connect the corresponding bit line with one of the first data line DL1 and/or the second data line DL2, and/or may disconnect the corresponding bit line from one and/or both the first data line DL1 and the second data line DL2. For example, under the control of the control logic circuit 140, the first selector SEL1 may connect the first bit line BL1 with one of the first data line DL1 and the second data line DL2 or may disconnect the bit line BL1 from both the first data line DL1 and the second data line DL2.

Through the above operation of the first to fourth selectors SEL1 to SEL4, at least one-bit line selected from the plurality of bit lines BL1 to BL4 may be connected with the first data line DL1, and at least one unselected bit line may be connected with the second data line DL2. For example, through the operations of the X-decoder 120 and the Y-decoder 130, at least one target PUF cell of a plurality of PUF cells may be connected with the first data line DL1, and at least one reference PUF cell of the plurality of PUF cells may be connected with the second data line DL2. Below, for convenience of description, the number of target PUF cells is described as "1" and the number of reference PUF cells is described as "1." However, the inventive concepts are not limited thereto, and the number of target PUF cells and/or the number of reference PUF cells may be, for example, one or more. The reference PUF cell may be a PUF cell that is in advance determined with respect to a target PUF cell.

The first reference resistor circuit R1 (for convenience of description, hereinafter referred to as a "first reference resistor") may be connected between a power supply voltage VDD and the first data line DL1. The second reference resistor circuit R2 (for convenience of description, hereinafter referred to as a "second reference resistor") may be connected between the power supply voltage VDD and the second data line DL2. In some example embodiments, the first reference resistor R1 and the second reference resistor R2 may have substantially the same resistance value. Alternatively, the first reference resistor R1 and the second reference resistor R2 may be implemented such that a deviation of the resistance values of the first reference resistor R1 and the second reference resistor R2 is minimized and/or otherwise reduced.

In some example embodiments wherein the first data line DL1 is the target line, a voltage of a first node n1 between the first data line DL1 and the first reference resistor R1 may be determined at least by a physical characteristic of a target PUF cell. In contrast, a voltage of a second node n2 between the second data line DL2 and the second reference resistor R2 may be determined by a physical characteristic of a reference PUF cell.

The sense amplifier SA may compare a voltage of the first node n1 and a voltage of the second node n2 and may output a target bit TB based on a comparison result. As described above, the voltage of the first node n1 may be determined by a physical characteristic of a target PUF cell, and the voltage of the second node n2 may be determined by a physical characteristic of a reference PUF cell. Accordingly, a polarity of a target PUF cell may be determined based on a result of comparing the voltages of the first and second nodes n1 and n2, and the target bit TB may be output based on the determined polarity.

The control logic circuit 140 may be configured to control overall operations of the PUF device 100 under the control of the controller 101. For example, the control logic circuit 140 may receive an address from the controller 101 and may control the X-decoder 120 and the Y-decoder 130 such that a PUF cell corresponding to the received address is selected as a target PUF cell. For example, the control logic circuit 140 may control the X-decoder 120 such that a word line connected with the PUF cell corresponding to the received address is activated and/or may control the Y-decoder 130 such that a bit line connected with the PUF cell corresponding to the received address is connected with the first data line DL1. In some example embodiments, the control logic circuit 140 may control the Y-decoder 130 such that a bit line connected with a reference PUF cell corresponding to the target PUF cell is connected with the second data line DL2.

Figure 3:
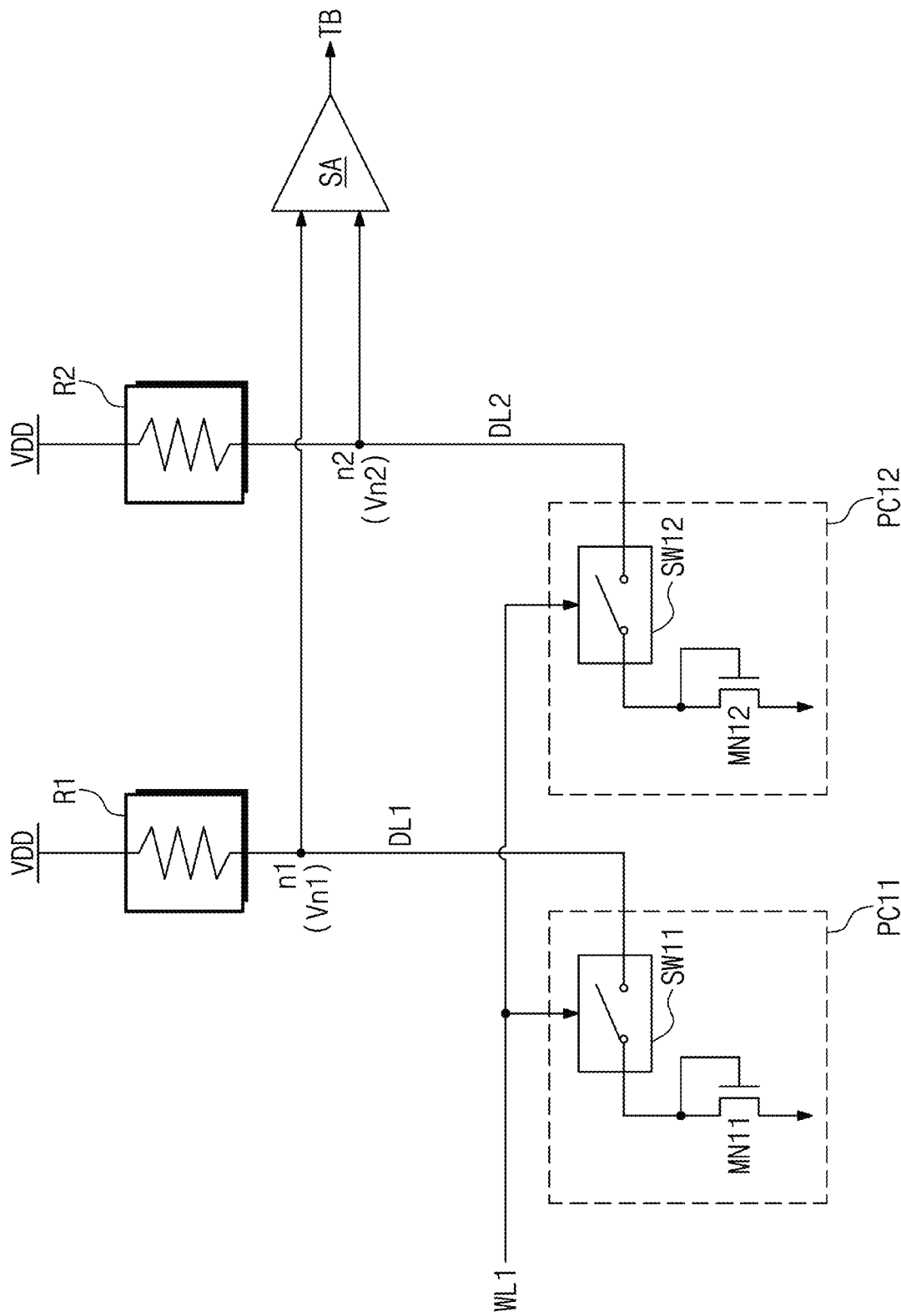
FIG. 3 is a diagram for describing an operation in which a PUF device of FIG. 2 determines a target bit.

FIG. 3 is a diagram for describing an operation in which a PUF device of FIG. 2 determines a target bit. For brevity and convenience of description, the target PUF cell is illustrated as the first PUF cell PC11 and the reference PUF cell is illustrated a second PUF cell PC12. However, the inventive concepts are not limited thereto. For example, the PUF cell and/or the number of target PUF cells used to determine one target bit and the PUF cell and/or the number of reference PUF cells used to determine one target bit may be variously changed or modified.

For brevity of drawing and convenience of description, the first PUF cell PC11 being the target PUF cell is illustrated as connected with the first node n1 (e.g., the first data line DL1) by the Y-decoder 130 and the second PUF cell PC12 being the reference PUF cell is illustrated connected with the second node n2 (e.g., the second data line DL2) by the Y-decoder 130.

The first PUF cell PC11 may include a first transistor MN11 and a first switch SW11. The first transistor MN11 may function as a diode-connected between the first switch SW11 and a specific voltage. The first switch SW11 may operate in response to a level of the first word line WL1.

The second PUF cell PC12 may include a second transistor MN12 and a second switch SW12. The second transistor MN12 may function as a diode-connected between the second switch SW12 and the specific voltage. The second switch SW12 may operate in response to the level of the first word line WL1.

As described above, because the first reference resistor R1 and the second reference resistor R2 may have substantially the same resistance value, a voltage Vn1 of the first node n1 may have a level according to a physical characteristic of the first PUF cell PC11 (e.g., a threshold voltage of the first transistor MN11), and a voltage Vn2 of the second node n2 may have a level according to a physical characteristic of the second PUF cell PC12 (e.g., a threshold voltage of the second transistor MN12).

The target bit TB corresponding to the target PUF cell may be determined by comparing voltage levels according to the physical characteristic of the target PUF cell and the physical characteristic of the reference PUF cell. For example, when the voltage Vn1 of the first node n1 is greater than the voltage Vn2 of the second node n2, the sense amplifier SA may output the target bit TB having a first logical value (e.g., bit "1"); when the voltage Vn1 of the first node n1 is smaller than the voltage Vn2 of the second node n2, the sense amplifier SA may output the target bit TB having a second logical value (e.g., bit "0").

In some example embodiments, the first and second reference resistors R1 and R2 may have substantially the same resistance value. For example, the first and second resistors R1 and R2 may be implemented such that a deviation of the resistance values of the first and second resistors R1 and R2 is minimized and/or otherwise reduced. In this case, because the voltages Vn1 and Vn2 of the first and second nodes n1 and n2 (respectively connected with the first and second resistors R1 and R2) are determined by the physical characteristics of the target PUF cell and the reference PUF cell, respectively, an iterative characteristic of the target bit TB may be secured.

Figure 4A:
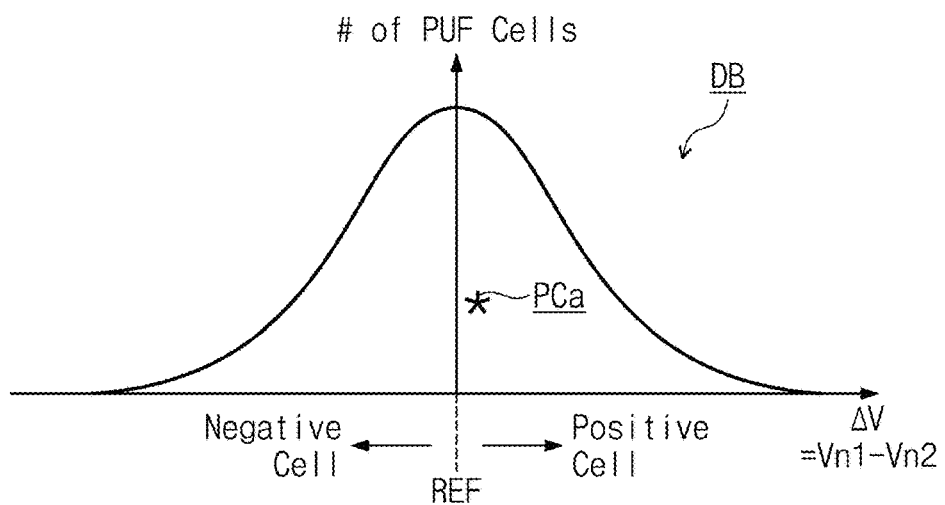
FIGS. 4A and 4B are distribution diagrams illustrating characteristics of a plurality of PUF cells included in a PUF cell array of FIG. 2.
Figure 4B:
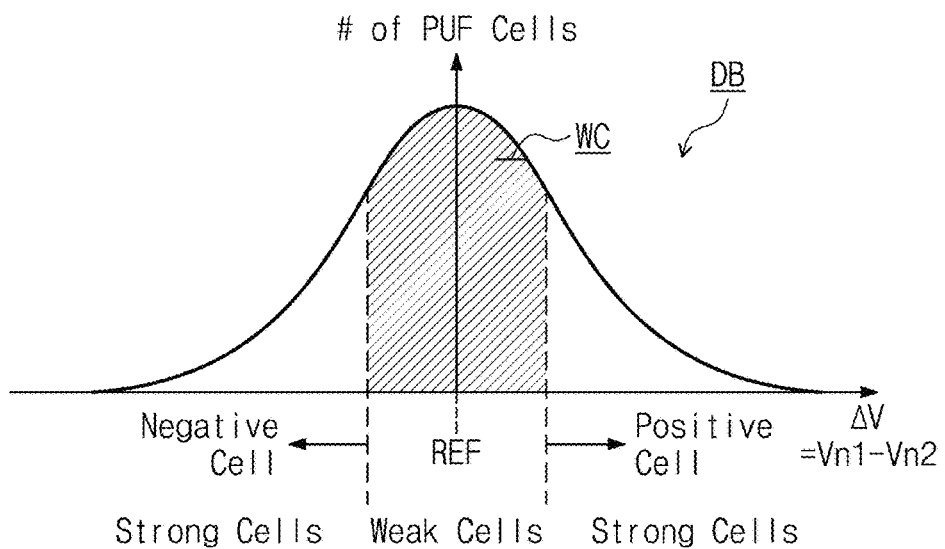

FIGS. 4A and 4B are distribution diagrams illustrating characteristics of a plurality of PUF cells included in a PUF cell array of FIG. 2. In the distribution diagrams of FIGS. 4A and 4B, a horizontal axis represents a mismatch value between a target PUF cell and a reference PUF cell (e.g., a difference (Vn1−Vn2) between a voltage of the first node n1 and a voltage of the second node n2), and a vertical axis represents the number of corresponding target PUF cells. Below, for convenience of description, the term "mismatch value" is used. In this case, the mismatch value may indicate a difference between information (e.g., the voltage Vn1 of the first node n1) coming from a physical characteristic of a target PUF cell and information (e.g., the voltage Vn2 of the second node n2) coming from a physical characteristic of a reference PUF cell corresponding to the target PUF cell.

Referring to FIG. 4A, mismatch values of a plurality of PUF cells may have a distribution DB as illustrated in FIG. 4A. The distribution DB may be a normal distribution and/or a Gaussian distribution. The plurality of PUF cells may be classified into cells having a positive polarity (e.g., Positive Cell) and/or cells having a negative polarity (e.g., Negative Cell), based on a reference value REF. For example, in the case where a mismatch value associated with a specific PUF cell is greater than the reference value REF, the specific PUF cell may be determined as a Positive Cell having a positive polarity; in the case where the mismatch value associated with the specific PUF cell is smaller than the reference value REF, the specific PUF cell may be determined as a Negative Cell having a negative polarity. In some example embodiments, the target bit TB associated with a Positive Cell having a positive polarity may be determined as a first logical value (e.g., bit "1"); the target bit TB associated with a Negative Cell having a negative polarity may be determined as a second logical value (e.g., bit "0").

In this case, as illustrated in FIG. 4A, a difference between a mismatch value associated with a specific PUF cell (e.g., PCa) and the reference value REF may be very small. The mismatch value associated with the specific PUF cell (e.g., PCa) may change as much as a given magnitude depending on various ambient factors (e.g., a temperature and a voltage). In this case, the specific PUF cell (e.g., PCa) may have a positive polarity or a negative polarity depending on an ambient factor. As a result, the target bit TB associated with the specific PUF cell may be changed. This may mean that an iterative characteristic and/or reliability of a target bit decreases.

To prevent and/or otherwise reduce the reduction of reliability, as illustrated in FIG. 4B, PUF cells in which a difference between a mismatch value and a reference value is equal to or smaller than a given magnitude may be classified as weak cells; PUF cells in which a difference between a mismatch value and a reference value is equal to or greater than a given magnitude may be classified as strong cells.

Strong cells may indicate cells in which the probability that a polarity changes, even with a mismatch value changes due to an ambient factor, is very low. In contrast, weak cells may indicate cells in which the probability that a polarity changes when a mismatch value changes (e.g., due to an ambient factor) is high. Accordingly, for a stable operation of the PUF device 100, there may be a need to sort weak cells WC.

Figure 5:
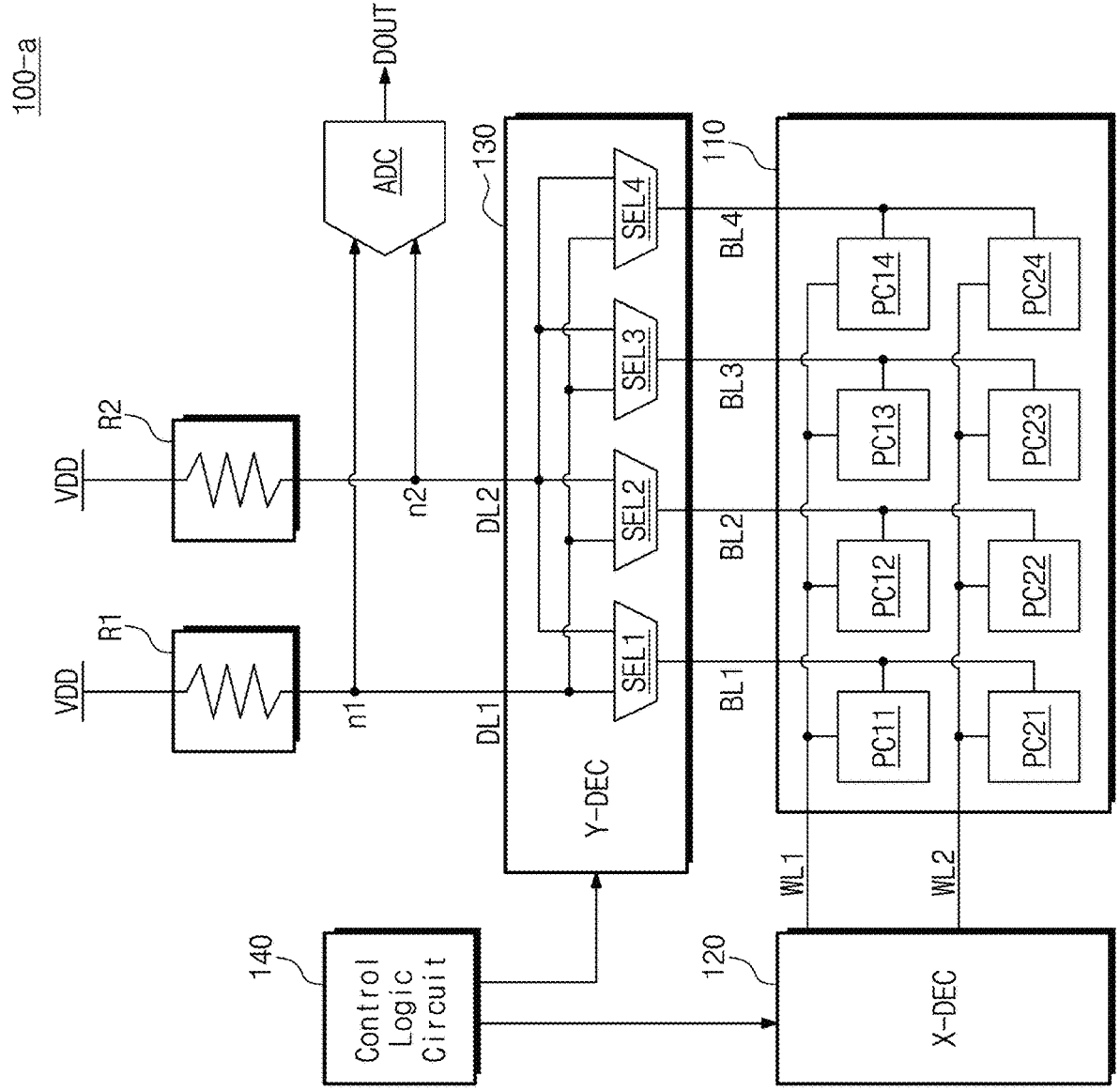
FIG. 5 is a diagram for describing a method for sorting weak cells of a plurality of PUF cells of a PUF device of FIG. 1.

FIG. 5 is a diagram for describing a method for sorting weak cells of a plurality of PUF cells of a PUF device of FIG. 1. Additional descriptions associated with the components described above will be omitted to avoid redundancy. Referring to FIGS. 1 and 5, a PUF device 100-a may include a PUF cell array 110, a X-decoder 120, a Y-decoder 130, a control logic circuit 140, a first reference resistor R2, a second reference resistor R2, and an analog-to-digital converter ADC. The PUF cell array 110, the X-decoder 120, the Y-decoder 130, the control logic circuit 140, the first reference resistor R1, and the second reference resistor R2 may be similar to those described above, and thus, additional description will be omitted to avoid redundancy.

The analog-to-digital converter ADC may output a difference between a voltage of the first node n1 and a voltage of the second node n2 as a digital signal DOUT. While the PUF device 100 of FIG. 2 may output the target bit TB (e.g., a one bit value) depending on a result of comparing the voltage of the first node n1 and the voltage of the second node n2, the PUF device 100-a of FIG. 5 may output the difference between the voltage of the first node n1 and the voltage of the second node n2 as the digital signal DOUT including a plurality of bits. In this case, the digital signal DOUT may include information about a mismatch value of a target PUF cell.

The PUF device 100-a may output the digital signal DOUT associated with each of a plurality of PUF cells under the control of the controller 101. The controller 101 may obtain information as illustrated in FIG. 4A and/or 4B (e.g., a mismatch value associated with each of the plurality of PUF cells) based on the digital signal DOUT received from the PUF device 100-a. For example, the controller 101 may classify the plurality of PUF cells into weak cells WC and strong cells based on the digital signal DOUT received from the PUF device 100-a. In some example embodiments, an address of a PUF cell classified as the weak cell WC may be stored in a separate storage circuit (not illustrated) included in the controller 101. Afterwards, the controller 101 may not perform an operation of obtaining a target bit of a PUF cell classified as a weak cell. For example, the controller 101 may perform the target bit obtaining operation only on a PUF cell classified as a strong cell.

Figure 6:
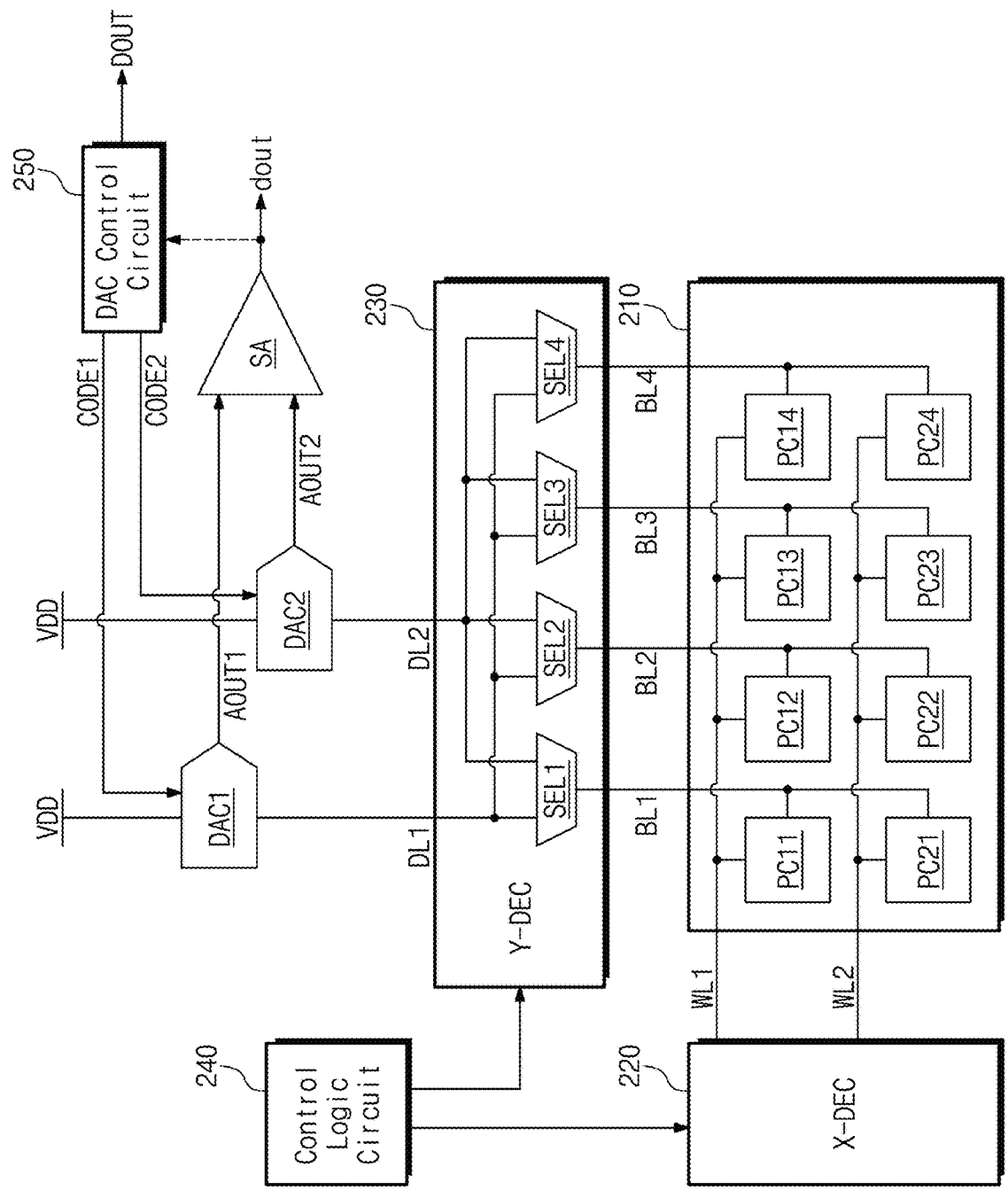
FIG. 6 is a diagram for describing a method for sorting weak cells of a plurality of PUF cells of a PUF device of FIG. 1.
Figure 7:
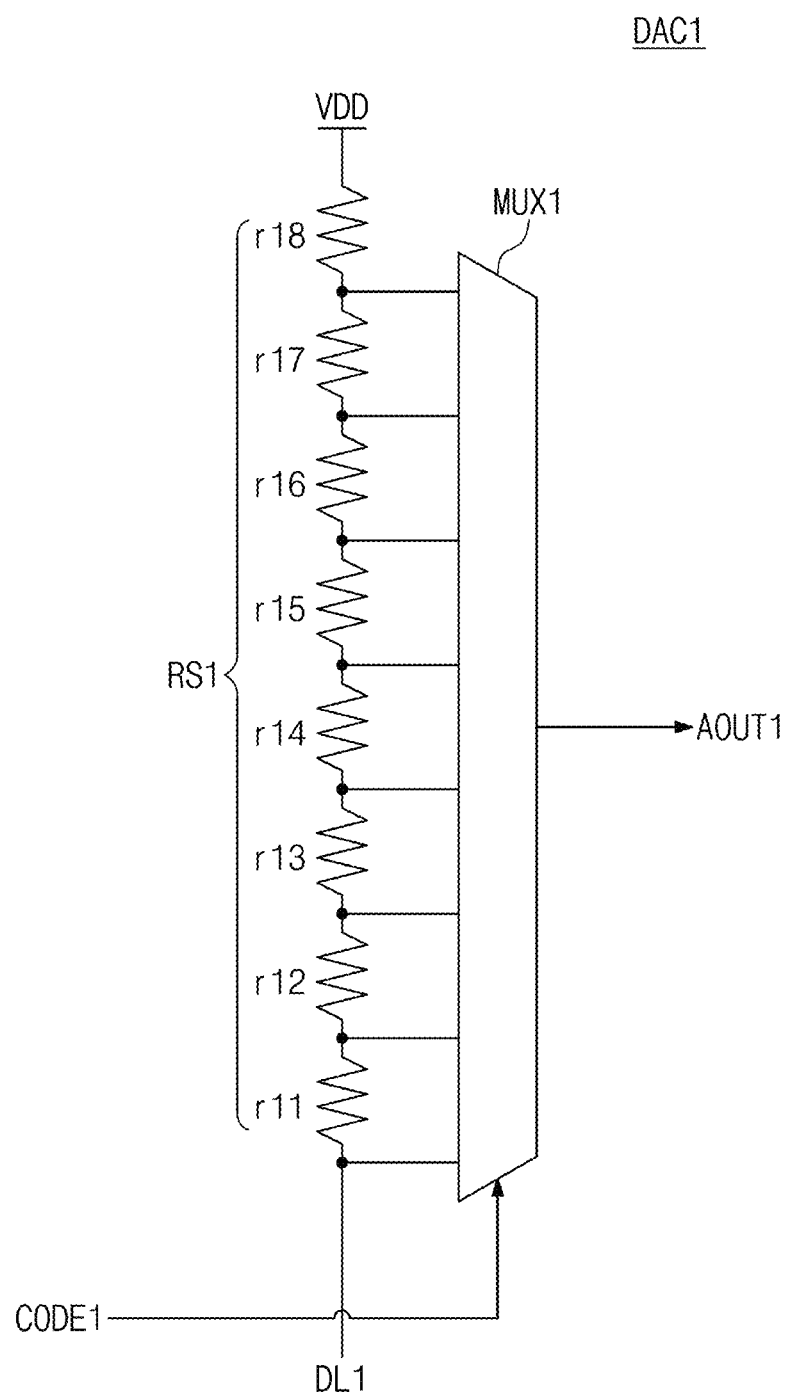
FIG. 7 is a block diagram illustrating a first digital-to-analog converter of FIG. 6.

FIG. 6 is a diagram for describing a method for sorting weak cells of a plurality of PUF cells of a PUF device of FIG. 1. FIG. 7 is a block diagram illustrating a first digital-to-analog converter of FIG. 6. Additional description associated with the components described above will be omitted to avoid redundancy.

Below, to describe the inventive concepts easily and concisely, an initialization operation of the PUF device 100 will be described. The initialization operation of the PUF device 100 may, for example, indicate an operation of collecting mismatch values respectively associated with a plurality of PUF cells, classifying the plurality of PUF cells into weak cells and strong cells based on the collected mismatch values, and storing information about the classification (e.g., address information and/or mismatch values of each PUF cell). After the initialization operation, in a normal operation, the PUF device 100 may perform a target bit determining operation on strong cells based on the stored information (e.g., the address information) and may generate a random key and/or a security key.

Referring to FIGS. 1, 6, and 7, a PUF device 200 may include a PUF cell array 210, an X-decoder 220, a Y-decoder 230, a control logic circuit 240, a first digital-to-analog converter DAC1, a second digital-to-analog converter DAC2, a DAC control circuit 250, and the sense amplifier SA. The PUF cell array 210, the X-decoder 220, the Y-decoder 230, and the control logic circuit 240 may be similar to those described above, and thus, additional description will be omitted to avoid redundancy.

Unlike the PUF device 100-a of FIG. 5, the PUF device 200 of FIG. 6 may include first and second digital-to-analog converters DAC1 and DAC2. The first digital-to-analog converter DAC1 may be connected between the power supply voltage VDD and the first data line DLL The first digital-to-analog converter DAC1 may output a first analog output AOUT1 in response to a first digital code CODE1 from the DAC control circuit 250. The second digital-to-analog converter DAC2 may be connected between the power supply voltage VDD and the second data line DL2. The second digital-to-analog converter DAC2 may output a second analog output AOUT2 in response to a second digital code CODE2 from the DAC control circuit 250.

In some example embodiments, the first analog output AOUT1 may be an analog signal obtained by converting the first digital code CODE1 within a voltage range from a voltage level of the first data line DL1 to the power supply voltage VDD. The second analog output AOUT2 may be an analog signal obtained by converting the second digital code CODE2 within a voltage range from a voltage level of the second data line DL2 to the power supply voltage VDD. In this case, a voltage of the first data line DL1 may be a voltage determined by a target PUF cell, and a voltage of the second data line DL2 may be a voltage determined by a reference PUF cell. For example, the first analog output AOUT1 may be a voltage obtained by dividing a first voltage range by using the first digital code CODE1, where the first voltage range is from the voltage determined by the target PUF cell to the power supply voltage VDD, and the second analog output AOUT2 may be a voltage obtained by dividing a second voltage range by using the second digital code CODE2, where the second voltage range is from the voltage determined by the reference PUF cell to the power supply voltage VDD.

For example, as illustrated in FIG. 7, the first digital-to-analog converter DAC1 may include a first resistor string RS1 and a first multiplexer MUX1. The first digital-to-analog converter DAC1 may be a resistive digital-to-analog converter (RDAC). The first resistor string RS1 may include a plurality of resistors r11 to r18 connected in series between the power supply voltage VDD and the first data line DL1. A plurality of terminals between the plurality of resistors r11 to r18 may be connected with the first multiplexer MUX1.

The first multiplexer MUX1 may select an output from one of the plurality of terminals as the first analog output AOUT1 in response to the first digital code CODE1. For example, when the first digital code CODE1 is of a value of "000," the first multiplexer MUX1 may select an output from a terminal between the first data line DL1 and the resistor r11 as the first analog output AOUT1. Alternatively, when the first digital code CODE1 is of a value of "001," the first multiplexer MUX1 may select an output from a terminal between the resistors r11 and r12 as the first analog output AOUT1. For example, the first analog output AOUT1 may indicate a voltage obtained by dividing the first voltage range by using the first digital code CODE1, where the first voltage range is from a voltage of the first data line DL1 to the power supply voltage VDD.

In some example embodiments, the second digital-to-analog converter DAC2 may be similar to the first digital-to-analog converter DAC1 except for the second data line DL2 and the second digital code CODE2, and thus, additional description will be omitted to avoid redundancy.

The sense amplifier SA may compare the first analog output AOUT1 and the second analog output AOUT2 and may output a comparison result dout. In some example embodiments, the comparison result dout may be a 1-bit digital signal.

The DAC control circuit 250 may control the first digital code CODE1 and/or the second digital code CODE2 based on the comparison result dout of the sense amplifier SA. For example, when the comparison result dout of the sense amplifier SA has a second logical value, the DAC control circuit 250 may increase the first digital code CODE1 and/or may decrease the second digital code CODE2. Alternatively, when the comparison result dout of the sense amplifier SA has a first logical value, the DAC control circuit 250 may decrease the first digital code CODE1 and/or may increase the second digital code CODE2. When the comparison result dout of the sense amplifier SA changes (e.g., from a first logical value to a second logical value or from the second logical value to the first logical value), the DAC control circuit 250 may output the digital output DOUT based on the first digital code CODE1 and the second digital code CODE2. In some example embodiments, the digital signal DOUT may include information about a mismatch value of a target PUF cell. An operation of the DAC control circuit 250 will be more fully described below.

As described above, the PUF device 200 according to some example embodiments of the inventive concepts may output mismatch values associated with a plurality of PUF cells as digital signals by using the digital-to-analog converter DAC. An external controller (e.g., 101 of FIG. 1) may classify the plurality of PUF cells into weak cells and strong cells based on the digital signals thus provided.

Figure 8:
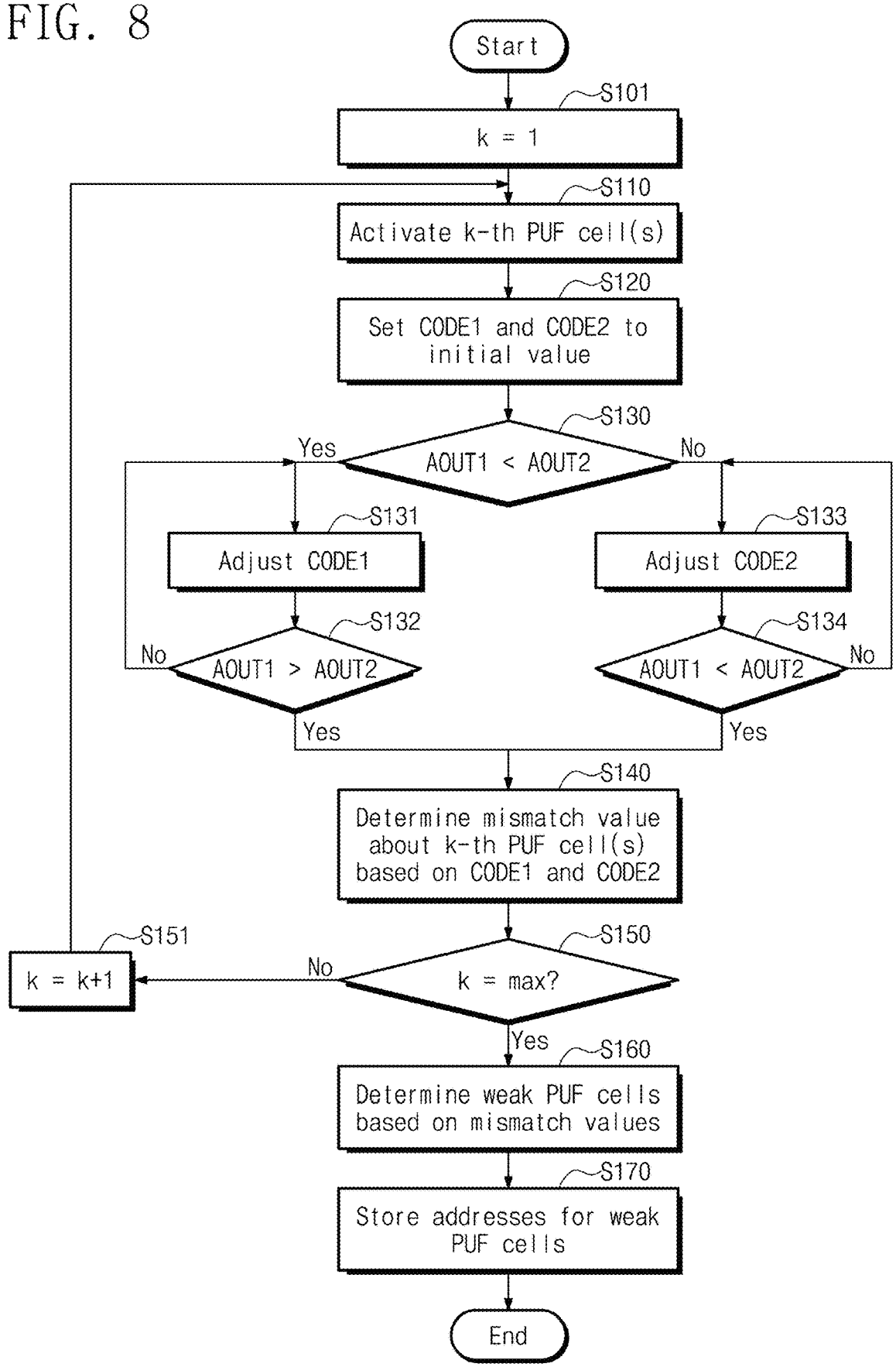
FIG. 8 is a flowchart illustrating an operation of a PUF device of FIG. 6.

FIG. 8 is a flowchart illustrating an operation of a PUF device of FIG. 6. In some example embodiments, an operation in which the PUF device 200 outputs a digital output (e.g., a mismatch value) associated with each of a plurality of PUF cells will be described with reference to FIG. 8. In an example embodiment, the operation according to the flowchart of FIG. 8 may be performed in the process of initializing the PUF device 200, and a target bit determining operation of the PUF device 200 may be performed based on address information stored according to the flowchart of FIG. 8.

Referring to FIGS. 6 and 8, in operation S101, a variable "k" may be set to "1." In some example embodiments, it may be understood that the variable "k" may represent an index for describing an iterative operation of the PUF device 200. In some example embodiments, the setting of the variable "k" may correspond to an address designated by the controller 101 (refer to FIG. 1).

In operation S110, the PUF device 200 may activate a k-th PUF cell. For example, the PUF device 200 may apply an active voltage to a word line connected with the k-th PUF cell. In this case, the active voltage may be a voltage for turning on a switch of the k-th PUF cell. The PUF device 200 may connect a bit line connected with the k-th PUF cell with the first data line DL1. In some example embodiments, the PUF device 200 may connect a bit line of a reference PUF cell corresponding to the k-th PUF cell with the second data line DL2.

In operation S120, the PUF device 200 may set the first digital code CODE1 and the second digital code CODE2 to an initial value. In some example embodiments, the initial value may indicate a digital code determined in advance. In some example embodiments, the initial value may be a digital code that is determined such that the voltage values of the first and second analog outputs AOUT1 and AOUT2 respectively output from the first and second digital-to-analog converters DAC1 and DAC2 are minimized or otherwise reduced. Below, for convenience of description, the initial value is described as a digital code that is determined such that the first and second analog outputs AOUT1 and AOUT2 are minimized. However, the inventive concepts are not limited thereto. For example, the initial value may be a digital code that is determined such that the voltage values of the first and second analog outputs AOUT1 and AOUT2 are maximized or otherwise increased; or may be a digital code that is determined such that the first and second analog outputs AOUT1 and AOUT2 have specific different levels and/or a specific ratio.

In operation S130, the PUF device 200 may compare magnitudes of the first analog output AOUT1 and the second analog output AOUT2. The first analog output AOUT1 may indicate a voltage obtained by dividing the first voltage range using the first digital code CODE1, where the first voltage range is derived from a voltage of the first data line DL1 to the power supply voltage VDD, and the second analog output AOUT2 may indicate a voltage obtained by dividing the second voltage range by using the second digital code CODE2, where the second voltage range is derived from a voltage of the second data line DL2 to the power supply voltage VDD.

When the first analog output AOUT1 is smaller than the second analog output AOUT2 (e.g., Yes in operation S130), in operation S131, the PUF device 200 may adjust the first digital code CODE1. For example, the PUF device 200 may increase and/or decrease the first digital code CODE1 as much as a given unit such that the first analog output AOUT1 increases. Afterwards, in operation S132, the PUF device 200 may determine whether the first analog output AOUT1 is greater than the second analog output AOUT2. When the first analog output AOUT1 is not greater than the second analog output AOUT2, the PUF device 200 may return to operation S131. When the first analog output AOUT1 is greater than the second analog output AOUT2 (e.g., a comparison result is changed by the adjustment of the first digital code CODE1), the PUF device 200 may perform operation S140.

When the first analog output AOUT1 is not smaller than the second analog output AOUT2 (e.g., No in operation S130), in operation S133, the PUF device 200 may adjust the second digital code CODE2. For example, the PUF device 200 may increase and/or decrease the second digital code CODE2 as much as a given unit such that the second analog output AOUT2 increases. Afterwards, in operation S134, the PUF device 200 may determine whether the second analog output AOUT2 is greater than the first analog output AOUT1. When the second analog output AOUT2 is not greater than the first analog output AOUT1, the PUF device 200 may return to operation S133. When the second analog output AOUT2 is greater than the first analog output AOUT1 (that is, a comparison result is changed by the adjustment of the second digital code CODE2), the PUF device 200 performs operation S140.

As described above, the PUF device 200 may adjust one of the first and second digital codes CODE1 and CODE2 until a comparison result of the first and second analog outputs AOUT1 and AOUT2 based on the first and second digital codes CODE1 and CODE2 is changed.

When the comparison result is changed (e.g., Yes in operation S132 and/or Yes in operation S134), the PUF device 200 may determine a mismatch value of the k-th PUF cell based on the first and second digital codes CODE1 and CODE2. For example, when the first and second digital codes CODE1 and CODE2 are set to an initial value of "000" and a comparison result is changed when the first digital code CODE1 is of a value of "011" a mismatch value of the k-th PUF cell may be determined as a value of "011." In this case, a magnitude of the mismatch value may correspond to a magnitude of "011," and the mismatch value of "011" may be output as the digital output DOUT. In some example embodiments, the digital output DOUT may be stored in an external controller (e.g., 101 of FIG. 1).

In operation S150, whether the variable "k" is a maximum and/or otherwise major value may be determined. When the variable "k" is not the maximum and/or major value (e.g., when a PUF cell targeted for the determination of a mismatch value exists), in operation S151, the PUF device 200 may return to operation S110.

When the variable "k" is the maximum or major value (e.g., when mismatch values of all the PUF cells are completely determined), in operation S160, the PUF device 200 may determine weak cells based on the mismatch values. For example, as described with reference to FIG. 4, when a difference between a mismatch value of a specific PUF cell and the reference value REF is equal to or less than a given value, the specific PUF cell may be determined as a weak cell. The PUF device 200 may determine weak cells based on the mismatch values of the plurality of PUF cells collected and/or obtained through operation S110 to operation S150.

In operation S170, the PUF device 200 may store address information about weak cells. In some example embodiments, the address information about the weak cells may be stored in a separate storage device. As the address information about the weak cells is stored, an operation of determining target bits of the weak cells may be omitted.

In some example embodiments, operation S160 and operation S170 may be performed by the external controller (e.g., 101 of FIG. 1). In some example embodiments, even though address information indicating whether each PUF cell is weak or strong is stored in the external controller, any other user or attacker may fail to recognize a random key to be generated from the PUF device 200. The reason is that a random key is generated based on polarity information about each of a plurality of PUF cells and address information includes only information about the reliability of each PUF cell. Accordingly, an external attacker may fail to generate a random key even though recognizing the address information.

Figure 9A:
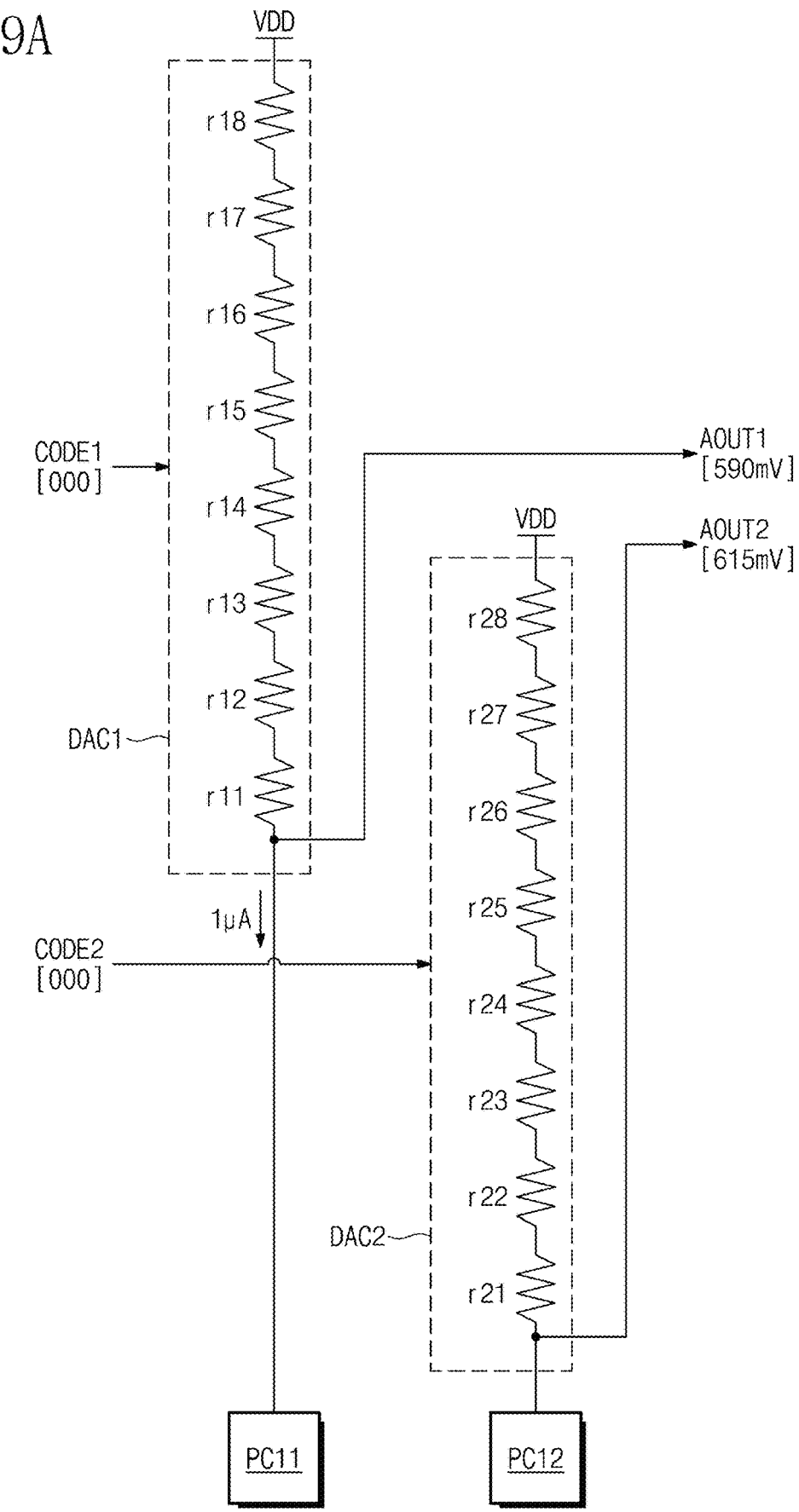
FIGS. 9A to 9C are diagrams for describing operations according to the flowchart of FIG. 8.
Figure 9B:
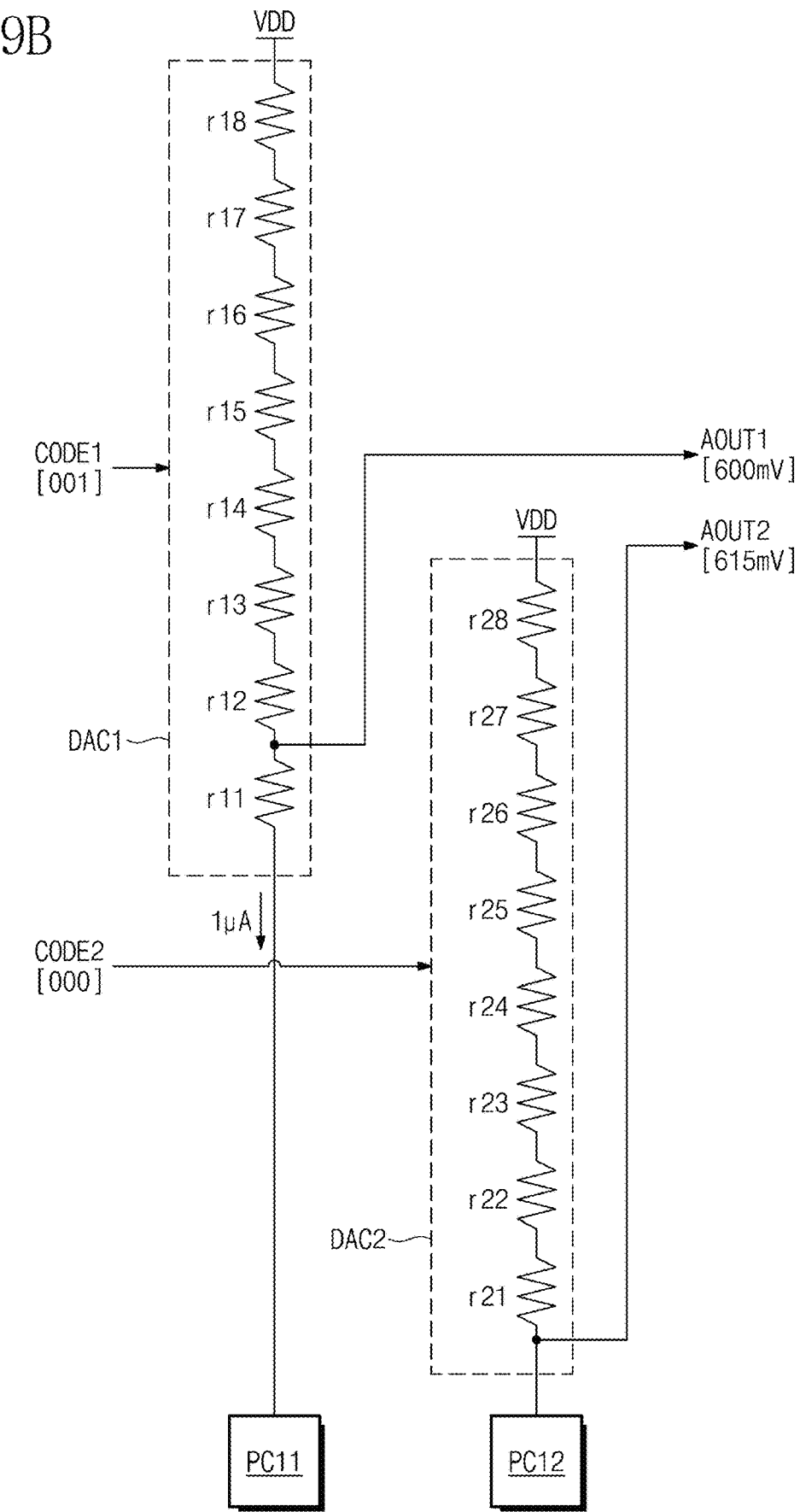
Figure 9C:
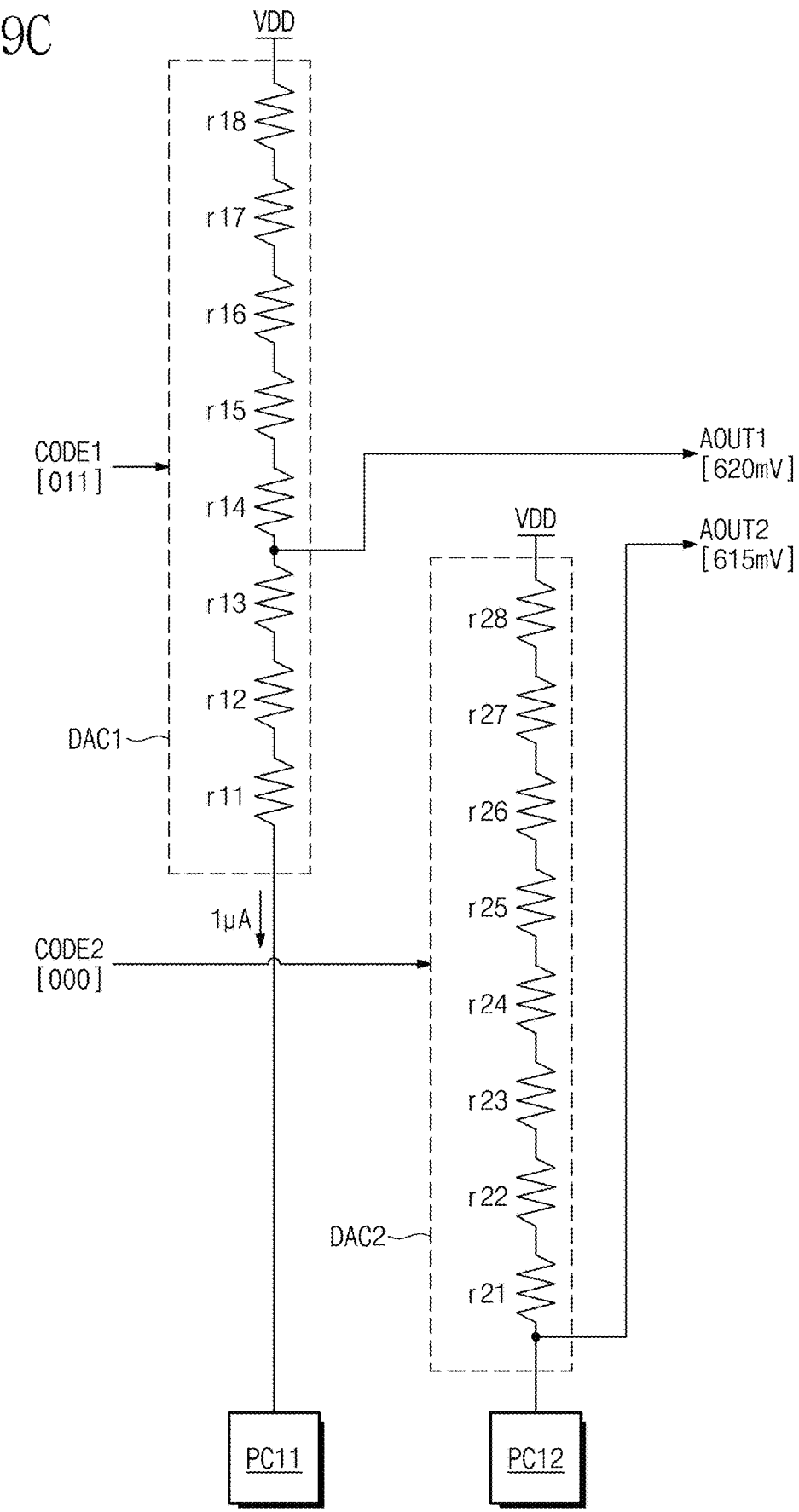

FIGS. 9A to 9C are diagrams for describing operations according to the flowchart of FIG. 8. For convenience of description, the first PUF cell PC11 is described as a target PUF cell and the second PUF cell PC12 is described as a reference PUF cell. The first digital-to-analog converter DAC1 is also illustrated as including 8 resistors r11 to r18, the second digital-to-analog converter DAC2 is illustrated as including 8 resistors r21 to r28, and each of the first and second digital codes CODE1 and CODE2 is described as a 3-bit code. However, as noted above, the inventive concepts are not limited thereto.

Referring to FIGS. 6 and 9A, the first PUF cell PC11 (being the target PUF cell) may be connected with the first data line DL1, and the second PUF cell PC12 (being the reference PUF cell) may be connected with the second data line DL2. The first digital-to-analog converter DAC1 may output a voltage from a terminal between the resistor r11 and the first PUF cell PC11 as the first analog output AOUT1 in response to the first digital code CODE1 having the initial value (e.g., "000"). The second digital-to-analog converter DAC2 may output a voltage from a terminal between the resistor r21 and the second PUF cell PC12 as the second analog output AOUT2 in response to the second digital code CODE2 having the initial value (e.g., "000").

For example, in the configuration of FIG. 9A, the first analog output AOUT1 is illustrated at a first initial output value of 590 mV and the second analog output AOUT2 is illustrated at a second initial output value of 615 mV. Also, a current of 1 uA flows through the first data line DL1 and each of the resistors r11 to r18 and r21 to r28 has a magnitude of 1 kΩ.

Because the first analog output AOUT1 is smaller than the second analog output AOUT2, the comparison result dout of the sense amplifier SA may have the second logical value. In this case, the DAC control circuit 250 may adjust the first digital code CODE1 in response to the comparison result dout of the second logical value. In some example embodiments, as illustrated in FIG. 9B, the DAC control circuit 250 may increase a value of the first digital code CODE1 as much as "1" and may output the first digital code CODE1 of "001."

In response to the first digital code CODE1 of "001," the first digital-to-analog converter DAC1 may change a terminal from which the first analog output AOUT1 is output. For example, as illustrated in FIG. 9B, the first digital-to-analog converter DAC1 may output a voltage from a terminal between the resistors r11 and r12 as the first analog output AOUT1. In this case, compared to the configuration of FIG. 9A, because the terminal for outputting the first analog output AOUT1 is shifted as much as one resistor, the first analog output AOUT1 may increase to 600 mV. In this case, the second digital code CODE2 may maintain the initial value (e.g., "000"). In FIG. 9B, when the first analog output AOUT1 is smaller than the second analog output AOUT2, the DAC control circuit 250 may further adjust the first digital code CODE1.

In some example embodiments, the DAC control circuit 250 may adjust the first digital code CODE1 in a given unit until the comparison result is changed (e.g., in this case until the first analog output AOUT1 is greater than the second analog output AOUT2). For example, as illustrated in FIG. 9C, the first digital-to-analog converter DAC1 may be set to "011", and the first digital-to-analog converter DAC1 may output a voltage from a terminal between the resistors r13 and r14 as the first analog output AOUT1 in response to the first digital code CODE1 of "011". In this case, the first analog output AOUT1 may increase to 620 mV. Accordingly, the first analog output AOUT1 may be greater than the second analog output AOUT2 of 615 mV.

When the first analog output AOUT1 is greater than the second analog output AOUT2, the comparison result dout of the sense amplifier SA may have the first logical value. In response to that the comparison result dout is changed, the DAC control circuit 250 may determine a mismatch value of the first PUF cell PC11 (being the target PUF cell) based on the first digital code CODE1 (e.g., "011") and the second digital code CODE2 (e.g., "000"). According to the configurations of FIGS. 9A to 9C, the mismatch value of the first PUF cell PC11 may correspond to a digital value of "011." The DAC control circuit 250 may output the determined mismatch value as the digital output DOUT.

As described above, the PUF device 200 may generate the first analog output AOUT1 based on the first digital code CODE1 and may generate the second analog output AOUT2 based on the second digital code CODE2. In this case, the first analog output AOUT1 may indicate a voltage obtained by dividing the first voltage range by using the first digital code CODE1, where the first voltage range is from a voltage of the first data line DL1 to the power supply voltage VDD, and the second analog output AOUT2 may indicate a voltage obtained by dividing the second voltage range by using the second digital code CODE2, where the second voltage range is from a voltage of the second data line DL2 to the power supply voltage VDD.

The PUF device 200 may adjust the first and second digital codes CODE1 and CODE2 based on a comparison result of the first and second analog outputs AOUT1 and AOUT2. The PUF device 200 may output a mismatch value associated with a target PUF cell as the digital output DOUT, based on the first and second digital codes CODE1 and CODE2 thus adjusted. Accordingly, the PUF device 200 may output a mismatch value associated with each of a plurality of PUF cells as the digital output DOUT through the above operation, and whether each PUF cell is a weak cell may be determined based on the digital output DOUT. Afterwards, because weak cells are not used in the determination of a target bit by masking and/or discarding weak cells, an iterative characteristic and/or reliability of a random key may be improved.

In some example embodiments, the description is given above as the digital codes CODE1 and CODE2 increase and/or decrease based on a binary code, but the inventive concepts are not limited thereto. For example, the digital codes CODE1 and CODE2 may be implemented with a reflected binary code (RBC) like a Gray code and/or a Lucal code). Alternatively, the DAC control circuit 250 may control the digital codes CODE1 and CODE2 based on a successive approximation register (SAR) manner. For example, wherein each of the first and second digital codes CODE1 and CODE2 is a 3-bit code the DAC control circuit 250 may operate based on the SAR manner, three bits of the digital output DOUT may be respectively determined through three comparison operations. For example, in the first comparison operation, the first and second digital codes CODE1 and CODE2 may be set to the initial value, and the first and second analog outputs AOUT1 and AOUT2 may be compared. When the first analog output AOUT1 is greater than the second analog output AOUT2, a first bit (e.g., a most significant bit (MSB), high-order bit, and/or left-most bit) of the digital output DOUT may be set to a first logical value (e.g., bit "1"); if not, the first bit may be set to a second logical value (e.g., bit "0").

In a second comparison operation, the first digital code CODE1 may be adjusted to be higher or lower, based on a result of the first comparison operation. A second bit (e.g., a center significant bit (CSB)) of the digital output DOUT may be determined as the first logical value or the second logical value, depending on a result of the second comparison operation. In a third comparison operation, the first digital code CODE1 may be adjusted to be higher or lower, based on a result of the second comparison operation. A third bit (e.g., a least significant bit (LSB), a low-order bit, and/or right-most bit) of the digital output DOUT may be determined as the first logical value or the second logical value, depending on a result of the third comparison operation.

As described above, the DAC control circuit 250 may adjust the first and second digital codes CODE1 and CODE2 through various manners and may output a mismatch value of a target PUF cell as the digital output DOUT based on the first and second digital codes CODE1 and CODE2 thus adjusted.

Figure 10:
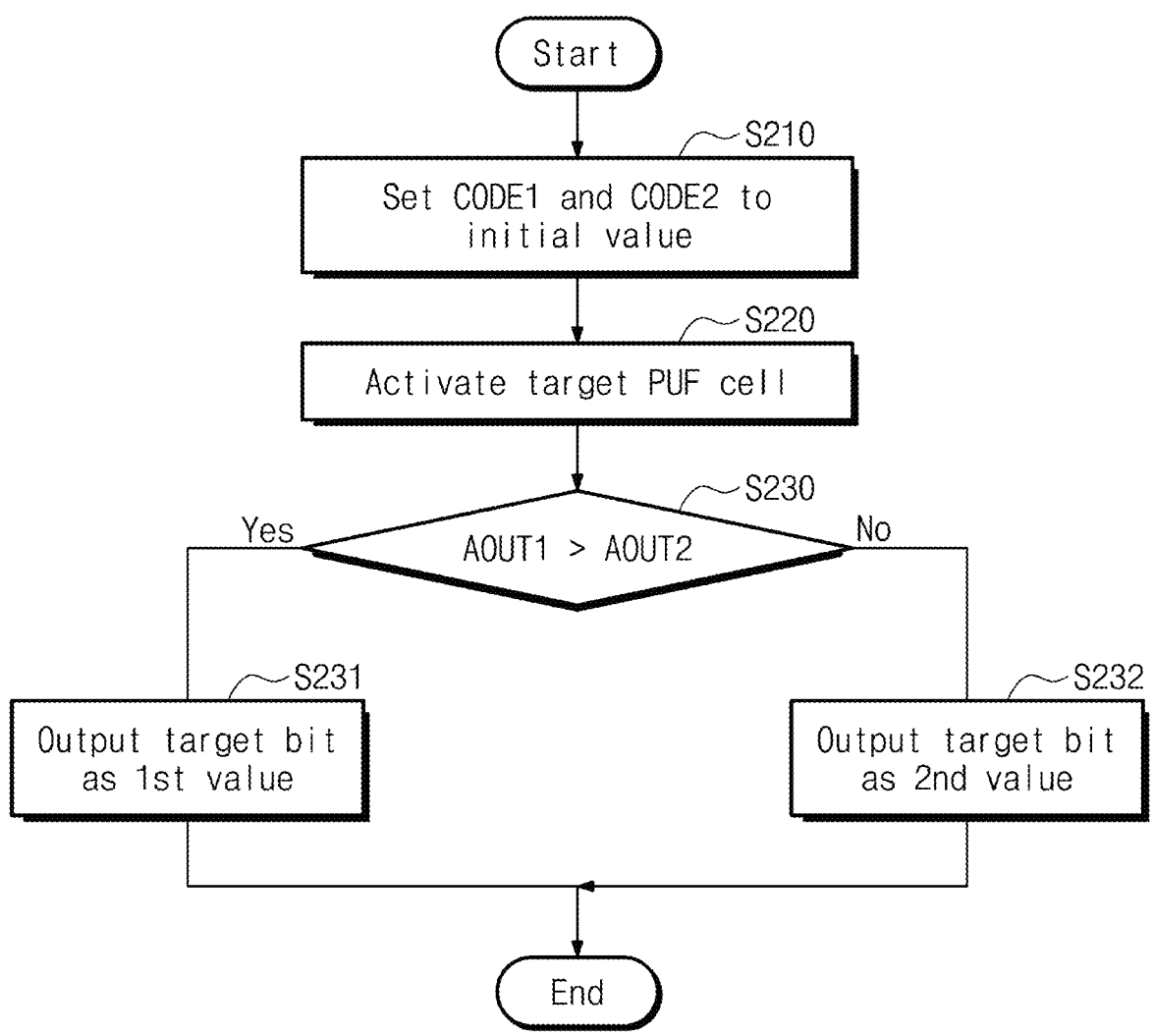
FIG. 10 is a flowchart illustrating a target bit determining operation of a PUF device of FIG. 6.

FIG. 10 is a flowchart illustrating a target bit determining operation of a PUF device of FIG. 6. In some example embodiments, the operation according to the flowchart of FIG. 10 may be performed to determine a target bit and/or to generate a random key by using the PUF device 200 after determining a mismatch value associated with each of a plurality of PUF cells as described above. In some example embodiments, the operation according to the flowchart of FIG. 10 may be performed only on PUF cells classified as strong cells.

Referring to FIGS. 6 and 10, in operation S210, the PUF device 200 may set the first and second digital codes CODE1 and CODE2 to the initial value. In some example embodiments, the initial value of the first and second digital codes CODE1 and CODE2 may be a digital code determined in advance. In some example embodiments, the initial value in operation S210 may be the same digital code as the initial value used in operation S120 of FIG. 8. In some example embodiments, while the PUF device 200 performs a normal operation (and/or a target bit determining operation and/or a random key generating operation) the first and second digital codes CODE1 and CODE2 may be maintained at the initial value.

In operation S220, the PUF device 200 may activate a target PUF cell. For example, the PUF device 200 may receive an address from an external controller (e.g., the controller 101 of FIG. 1) and may activate a target PUF cell corresponding to the received address. The activating of the target PUF cell may include applying an active voltage to a word line connected with the target PUF cell, connecting a bit line of the target PUF cell with the first data line DL1, and connecting a bit line of a reference PUF cell corresponding to the target PUF cell with the second data line DL2.

In operation S230, the PUF device 200 may compare the first analog output AOUT1 and the second analog output AOUT2. When the first analog output AOUT1 is greater than the second analog output AOUT2, in operation S231, the PUF device 200 may output the target bit TB as a first value; and/or when the first analog output AOUT1 is not greater than the second analog output AOUT2, in operation S232, the PUF device 200 may output the target bit TB as a second value.

Figure 11:
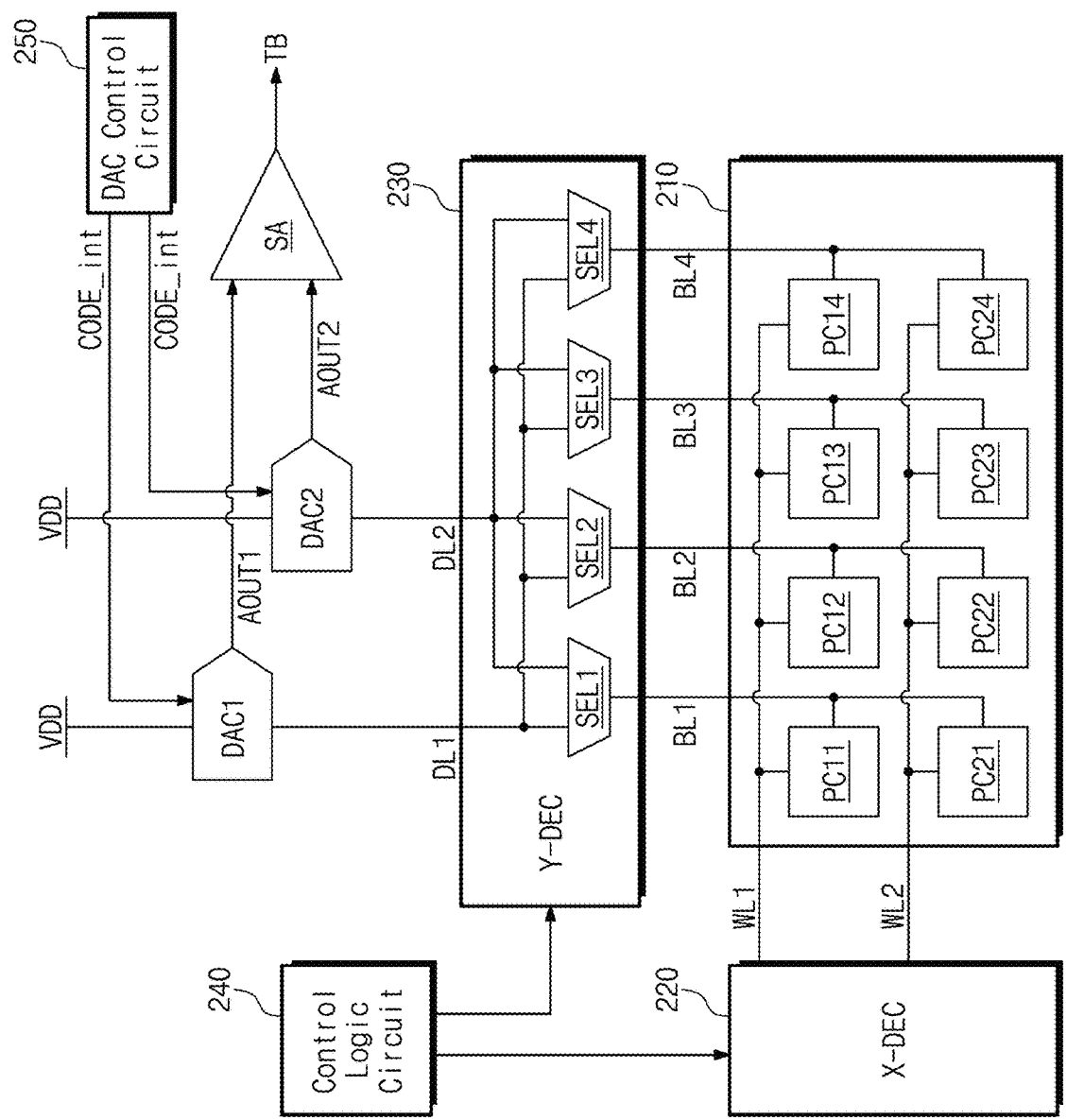
FIG. 11 is a diagram for describing an operation according to the flowchart of FIG. 10.

FIG. 11 is a diagram for describing an operation according to the flowchart of FIG. 10. For convenience of description, additional description associated with the components described above will be omitted to avoid redundancy. Referring to FIG. 11, the PUF device 200 may include the PUF cell array 210, the X-decoder 220, the Y-decoder 230, the control logic circuit 240, the first and second digital-to-analog converters DAC1 and DAC2, and the sense amplifier SA.

As described with reference to FIG. 10, in a normal operation (and/or an operation of determining the target bit TB associated with a target PUF cell and/or a random key generating operation) of the PUF device 200, the DAC control circuit 250 may set the first and second digital codes CODE1 and CODE2 to the initial value. In some example embodiments, the initial values of the first and second digital codes CODE1 and CODE2 may be the same as the initial values used in operation S120 of FIG. 8. In this case, the first digital-to-analog converter DAC1 may output the first analog output AOUT1 based on a physical characteristic of a target PUF cell, and the second digital-to-analog converter DAC2 may output the second analog output AOUT2 based on a physical characteristic of a reference PUF cell. The sense amplifier SA may compare the first analog output AOUT1 and the second analog output AOUT2 and may output the target bit TB based on the comparison result.

As described above, the PUF device 200, according to some example embodiments of the inventive concepts, may output a mismatch value associated with the target PUF cell as the digital output DOUT by using digital-to-analog converters. The PUF device 200 may determine whether the target PUF cell is a weak cell based on the digital output DOUT and may store address information corresponding to the target PUF cell determined as a weak cell. Afterwards, in the normal operation, the PUF device 200 may not use a PUF cell, which is determined as a weak cell, as a target PUF cell (e.g., may use only a strong cell as a target PUF cell), and thereby an iterative characteristic of the target bit TB may be secured. In this way, the reliability of the PUF device 200 may be improved.

Figure 12:
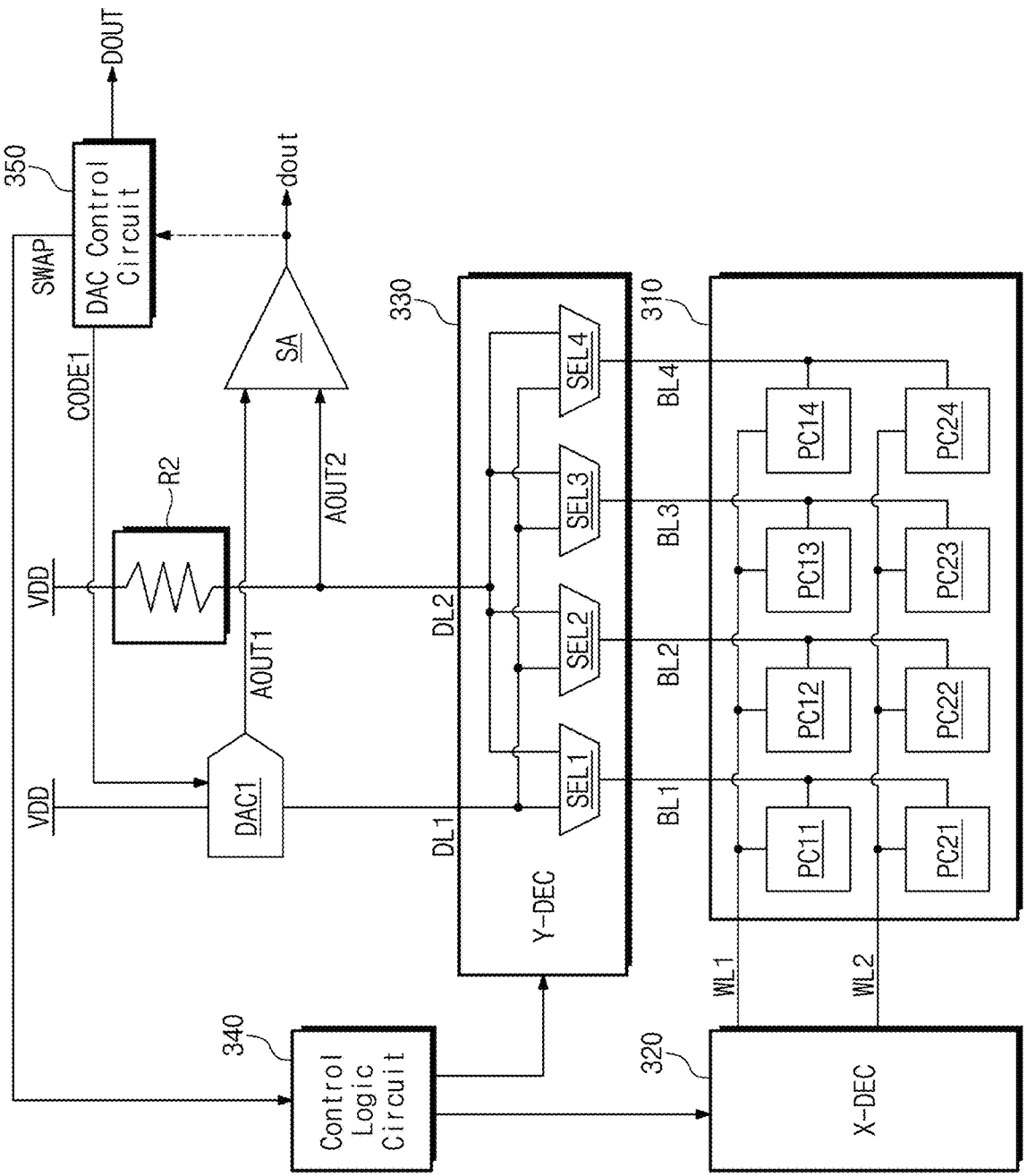
FIG. 12 is a diagram illustrating a PUF device according to some example embodiments of the inventive concepts.

FIG. 12 is a diagram illustrating a PUF device according to some example embodiments of the inventive concepts. For convenience of description, additional description associated with the components described above will be omitted to avoid redundancy. Referring to FIG. 12, a PUF device 300 may include a PUF cell array 310, an X-decoder 320, a Y-decoder 330, a control logic circuit 340, the second reference resistor R2, the first digital-to-analog converter DAC1, and the sense amplifier SA. The PUF cell array 310, the X-decoder 320, the Y-decoder 330, and the control logic circuit 340 are described above, and thus, additional description will be omitted to avoid redundancy.

The PUF device 300 of FIG. 12 may include a DAC (e.g., the first digital-to-analog converter DAC1) and a reference resistor (e.g., the second reference resistor R2). The first digital-to-analog converter DAC1 may be connected between the power supply voltage VDD and the first data line DL1 and may output the first analog output AOUT1 in response to the first digital code CODE1 from a DAC control circuit 350. The first analog output AOUT1 may be a voltage obtained by dividing the first voltage range by using the first digital code CODE1, where the first voltage range is derived from a voltage of the first data line DL1 to the power supply voltage VDD.

The second reference resistor R2 may be connected between the power supply voltage VDD and the second data line DL2. A voltage of the second node where the second reference resistor R2 and the second data line DL2 are connected may be the second analog output AOUT2. In some example embodiments, a resistance value of the second reference resistor R2 may be substantially the same as a resistance value of a resistor string included in the first digital-to-analog converter DAC1.

The sense amplifier SA may compare the first analog output AOUT1 and the second analog output AOUT2 and may output the comparison result dout. Based on the comparison result dout of the sense amplifier SA, the DAC control circuit 350 may adjust the first digital code CODE1 and/or may output a swap signal SWAP to the control logic circuit 340. The control logic circuit 340 may control the Y-decoder 330 in response to the swap signal SWAP such that a target PUF cell is connected with the second data line DL2 and a reference PUF cell is connected with the first data line DL1.

For example, the DAC control circuit 350 may adjust the first digital code CODE1 such that the first analog output AOUT1 increases. In a state where the first digital code CODE1 remains at the initial value, when the first analog output AOUT1 is greater than the second analog output AOUT2, a comparison result may not be changed even though the first digital code CODE1 is adjusted. For this reason, the digital output DOUT corresponding to a magnitude difference of the first analog output AOUT1 and the second analog output AOUT2 may not be generated.

In this case, the DAC control circuit 350 may output the swap signal SWAP. In response to the swap signal SWAP, the control logic circuit 340 may allow a reference PUF cell to be connected with the first data line DL1 and a target PUF cell to be connected with the second data line DL2. In this case, in a state where the first digital code CODE1 remains at the initial value, when the first analog output AOUT1 is greater than the second analog output AOUT2, the first digital code CODE1 may be adjusted (e.g., the first analog output AOUT1 may be decreased). Accordingly, the digital output DOUT corresponding to a mismatch value of the target PUF cell may be output.

In some example embodiments, the digital output DOUT may include information about an absolute value and/or a magnitude of the mismatch value. In this case, information about a polarity of a target PUF cell may not be required to determine a weak cell of a plurality of PUF cells, and only information about an absolute value or a magnitude of a mismatch value may be required. Accordingly, even though the digital output DOUT includes only information about an absolute value and/or a magnitude of a mismatch value, a weak cell may be normally determined. An operation of the PUF device 300 of FIG. 12 will be more fully described with reference to FIG. 13.

Figure 13:
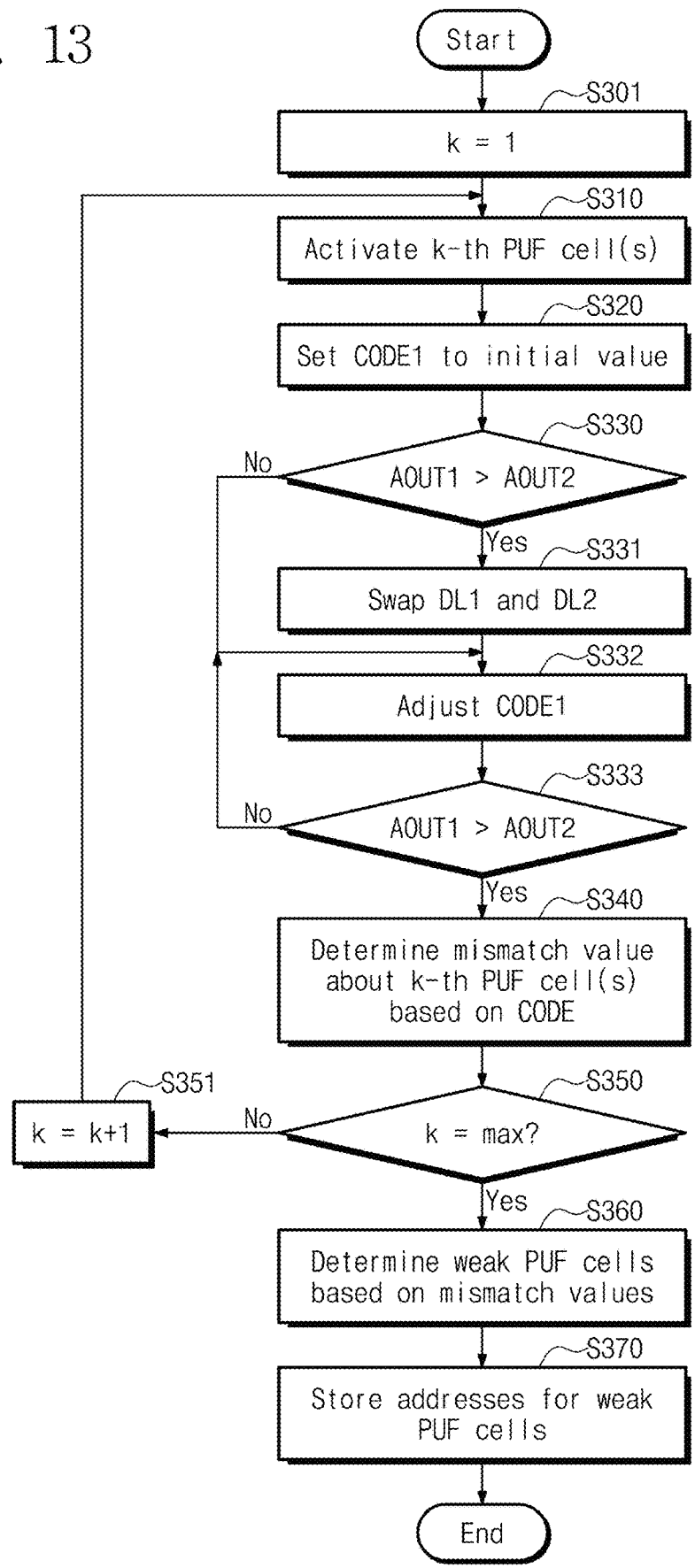
FIG. 13 is a flowchart illustrating an operation of a PUF device of FIG. 12.

FIG. 13 is a flowchart illustrating an operation of a PUF device of FIG. 12. Referring to FIGS. 12 and 13, in operation S301, a variable "k" may be set to "1." In operation S320, the PUF device 300 may activate a k-th PUF cell. Operation S301 and operation S310 may be similar and/or identical to operation S201 and operation S210 of FIG. 8, and thus, additional description will be omitted to avoid redundancy.

In operation S320, the PUF device 300 may set the first digital code CODE1 to the initial value. In some example embodiments, the initial value of the first digital code CODE1 may be a value that is determined such that a magnitude of the first analog output AOUT1 output from the first digital-to-analog converter DAC1 is at a minimum (or otherwise minor) value. However, the inventive concepts are not limited thereto.

In operation S330, the PUF device 300 may compare the first analog output AOUT1 and the second analog output AOUT2.

When the first analog output AOUT1 is greater than the second analog output AOUT2, in operation S331, the PUF device 300 may swap the first data line DL1 and the second data line DL2. For example, when the first analog output AOUT1 is greater than the second analog output AOUT2, even though the first digital code CODE1 is adjusted, the comparison result dout may not be changed. In this case, the DAC control circuit 350 may output the swap signal SWAP. The control logic circuit 340 may control the Y-decoder 330 in response to the swap signal SWAP such that a target PUF cell is connected with the second data line DL2 and a reference PUF cell is connected with the first data line DL1. In this case, the reference PUF cell may be connected with the first digital-to-analog converter DAC1 through the first data line DL1, and the target PUF cell may be connected with the second reference resistor R2 through the second data line DL2. This configuration may be the same as a configuration in which the first and second data lines DL1 and DL2 are swapped in a state where the reference PUF cell is connected with the second data line DL2 and the target PUF cell is connected with the first data line DL1 and/or may have the same function/effect as the configuration in which the first and second data lines DL1 and DL2 are swapped in the above state. Thereby, through operation S331, the first analog output AOUT1 may be smaller than the second analog output AOUT2.

When a result in operation S330 indicates that the first analog output AOUT1 is smaller than the second analog output AOUT2 and/or after operation S331, in operation S332, the PUF device 300 may adjust the first digital code CODE1. For example, the DAC control circuit 350 may adjust the first digital code CODE1 as much as a given value and/or a given code such that a magnitude of the first analog output AOUT1 increases.

In operation S333, the PUF device 300 may compare the first analog output AOUT1 and the second analog output AOUT2. When the first analog output AOUT1 is not greater than the second analog output AOUT2, the PUF device 300 may return to operation S332. When the first analog output AOUT1 is greater than the second analog output AOUT2 (e.g., when a comparison result is changed), in operation S340, the PUF device 300 may determine a mismatch value of the target PUF cell based on the first digital code CODE1 thus adjusted. The determined mismatch value may be output as the digital output DOUT.

Afterwards, the PUF device 300 may perform operation S350 to operation S370. Operation S350 to operation S370 may be similar to operation S150 to operation S170 of FIG. 8, and thus, additional description will be omitted to avoid redundancy.

Figure 14A:
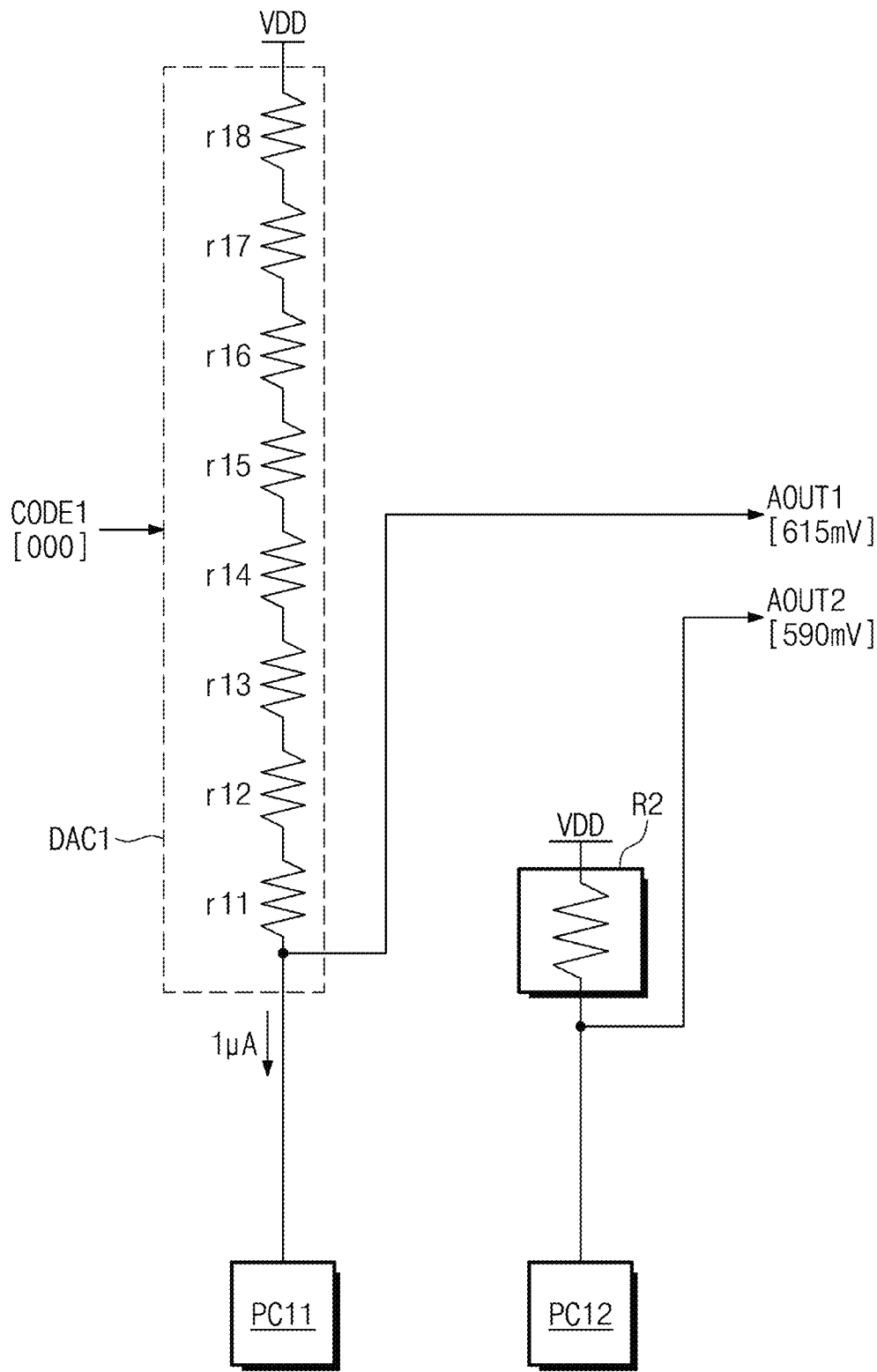
FIGS. 14A and 14B are diagrams for describing operation S331 of FIG. 13, and a method to swap data lines.
Figure 14B:
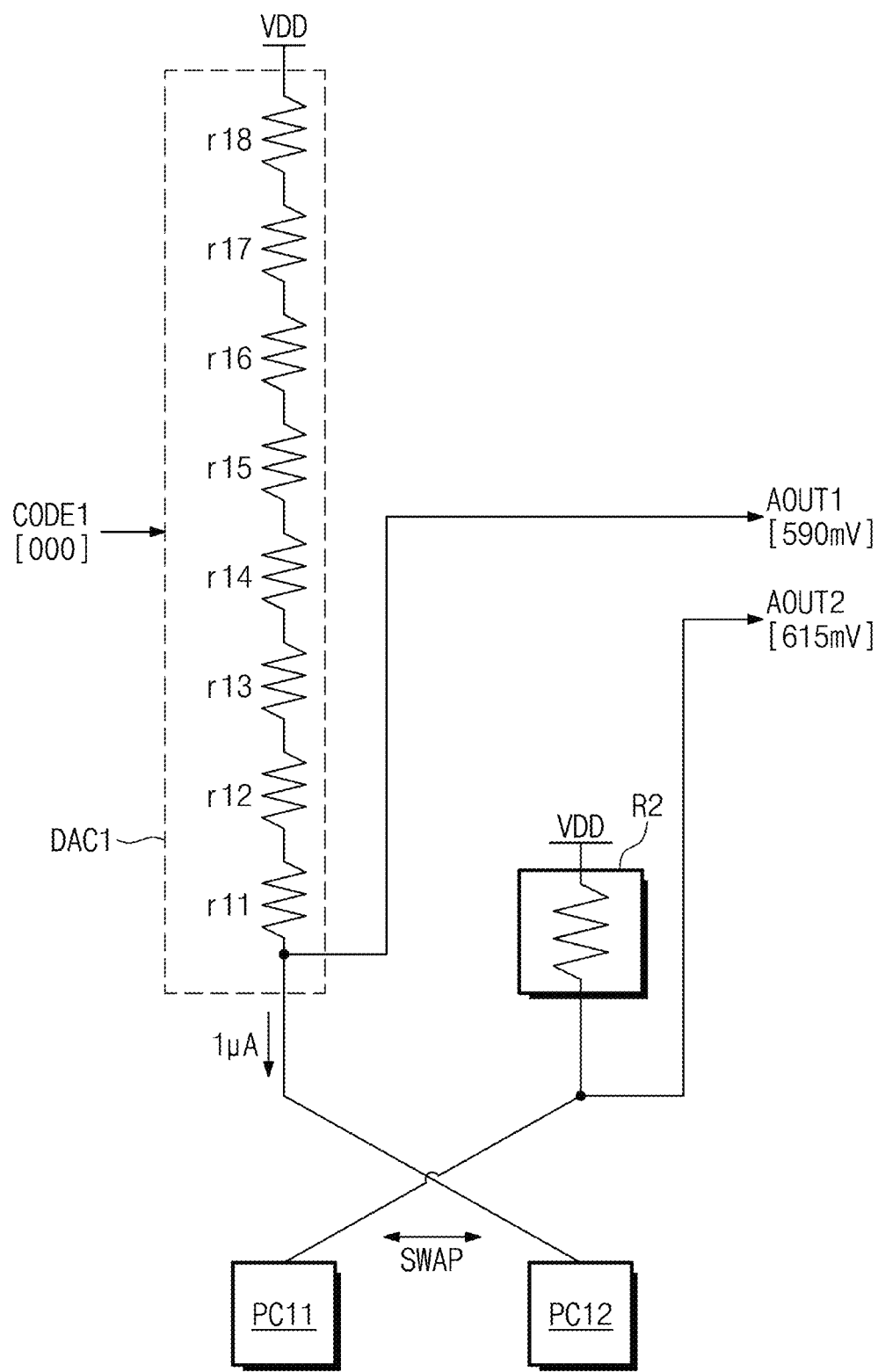

FIGS. 14A and 14B are diagrams for describing operation S331 of FIG. 13, and how to swap data lines. For convenience of description, it is assumed that a target PUF cell is the first PUF cell PC11 and a reference PUF cell is the second PUF cell PC12.

Referring to FIGS. 12 and 14A, the first digital-to-analog converter DAC1 may include the plurality of resistors r11 to r18 connected in series between the power supply voltage VDD and the first data line DL1 and may output the first analog output AOUT1 in response to the first digital code CODE1. The second reference resistor R2 may be connected between the power supply voltage VDD and the second data line DL2.

When the first digital code CODE1 is of the initial value (e.g., "000"), the first analog output AOUT1 may be at a first initial output value (e.g., 615 mV), and the second analog output AOUT2 may be at a second initial output value (590 mV). In this case, even though the first digital code CODE1 is adjusted, because the first analog output AOUT1 is smaller than the second analog output AOUT2, it may be impossible and/or difficult to determine the digital output DOUT. In this case, the DAC control circuit 350 may output the swap signal SWAP, and the control logic circuit 340 may swap connections of the first and second PUF cells PC11 and PC12 in response to the swap signal SWAP.

For example, as illustrated in FIG. 14B, under the control of the control logic circuit 340, the first PUF cell PC11 being the target PUF cell may be connected with the second reference resistor R2, and the second PUF cell PC12 being the reference PUF cell may be connected with the first digital-to-analog converter DAC1. In this case, because the first analog output AOUT1 is determined by a physical characteristic of the second PUF cell PC12 being the reference PUF cell, the first analog output AOUT1 may be 590 mV; because the second analog output AOUT2 is determined by a physical characteristic of the first PUF cell PC11 being the target PUF cell, the second analog output AOUT2 may be 615 mV. In this case, as the first digital code CODE1 is adjusted, the first analog output AOUT1 may increase, and thus, the digital output DOUT may be normally determined.

Figure 15:
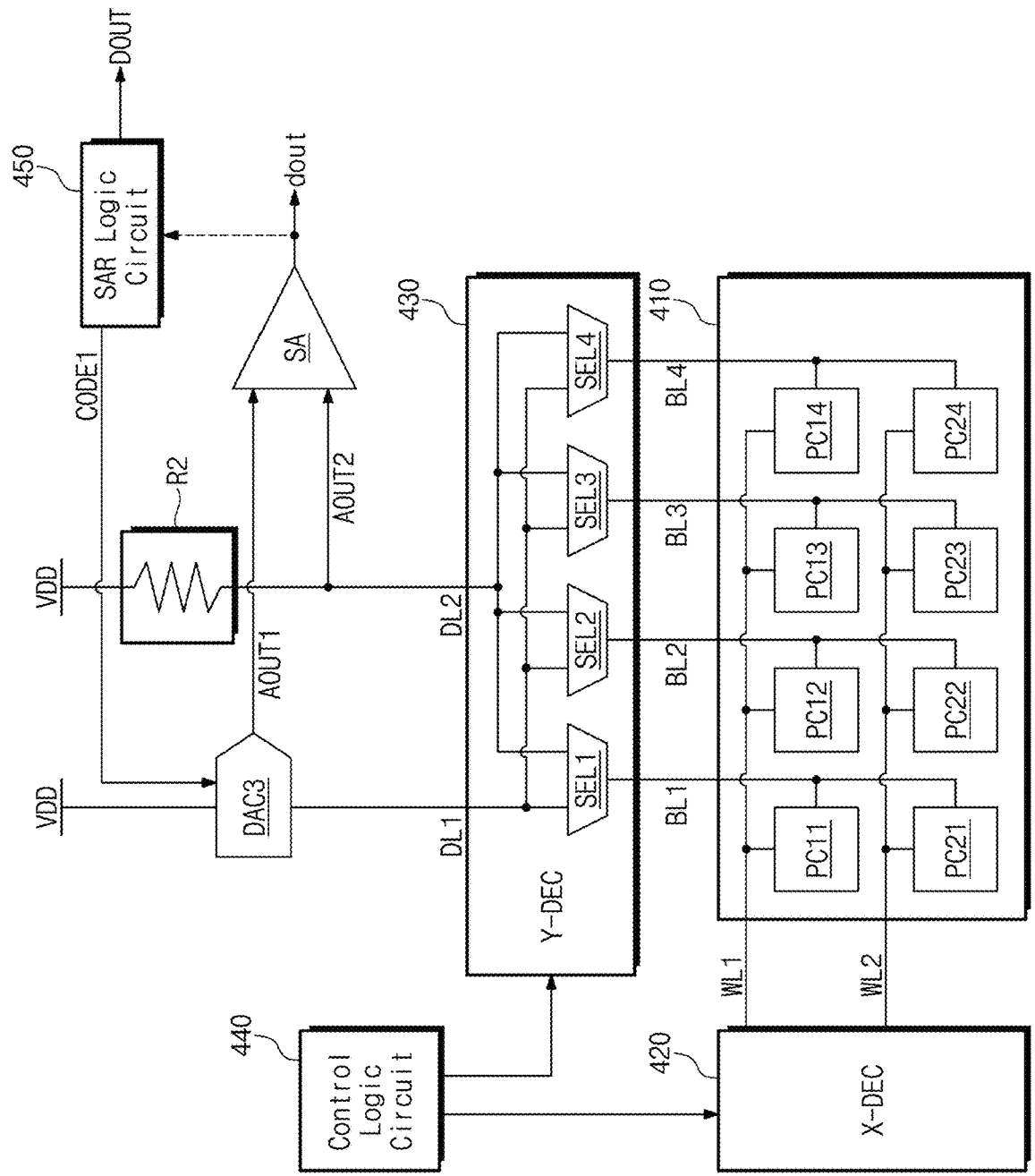
FIG. 15 is a diagram illustrating a PUF device according to some example embodiments of the inventive concepts.

FIG. 15 is a diagram illustrating a PUF device according to some example embodiments of the inventive concepts. For convenience of description, additional description associated with the components described above will be omitted to avoid redundancy. Referring to FIG. 15, a PUF device 400 may include a PUF cell array 410, an X-decoder 420, a Y-decoder 430, a control logic circuit 440, an SAR logic circuit 450, the second reference resistor R2, a third digital-to-analog converter DAC3, and the sense amplifier SA. The PUF cell array 410, the X-decoder 420, the Y-decoder 430, and the control logic circuit 440 are described above, and thus, additional description will be omitted to avoid redundancy.

The third digital-to-analog converter DAC3 may be connected between the power supply voltage VDD and the first data line DL1. The third digital-to-analog converter DAC3 may output the first analog output AOUT1 in response to the first digital code CODE1. In some example embodiments, a resistance value of a resistor string including some resistors of a plurality of resistors included in the third digital-to-analog converter DAC3 may be substantially the same as the resistance value of the second reference resistor R2. In some example embodiments, a voltage from a terminal (which is selected by the initial value of the first digital code CODE1) from among terminals of the resistor string including some resistors of the plurality of resistors included in the third digital-to-analog converter DAC3 may be selected as the first analog output AOUT1.

The SAR logic circuit 450 may control the third digital-to-analog converter DAC3 through an SAR manner. For example, the SAR logic circuit 450 may determine each bit of the digital output DOUT based on the comparison result dout from the sense amplifier SA. In this case, the digital output DOUT may be determined without an operation of swapping a target PUF cell and a reference PUF cell and/or an operation of swapping the first and second data lines DL1 and DL2.

Figure 16:
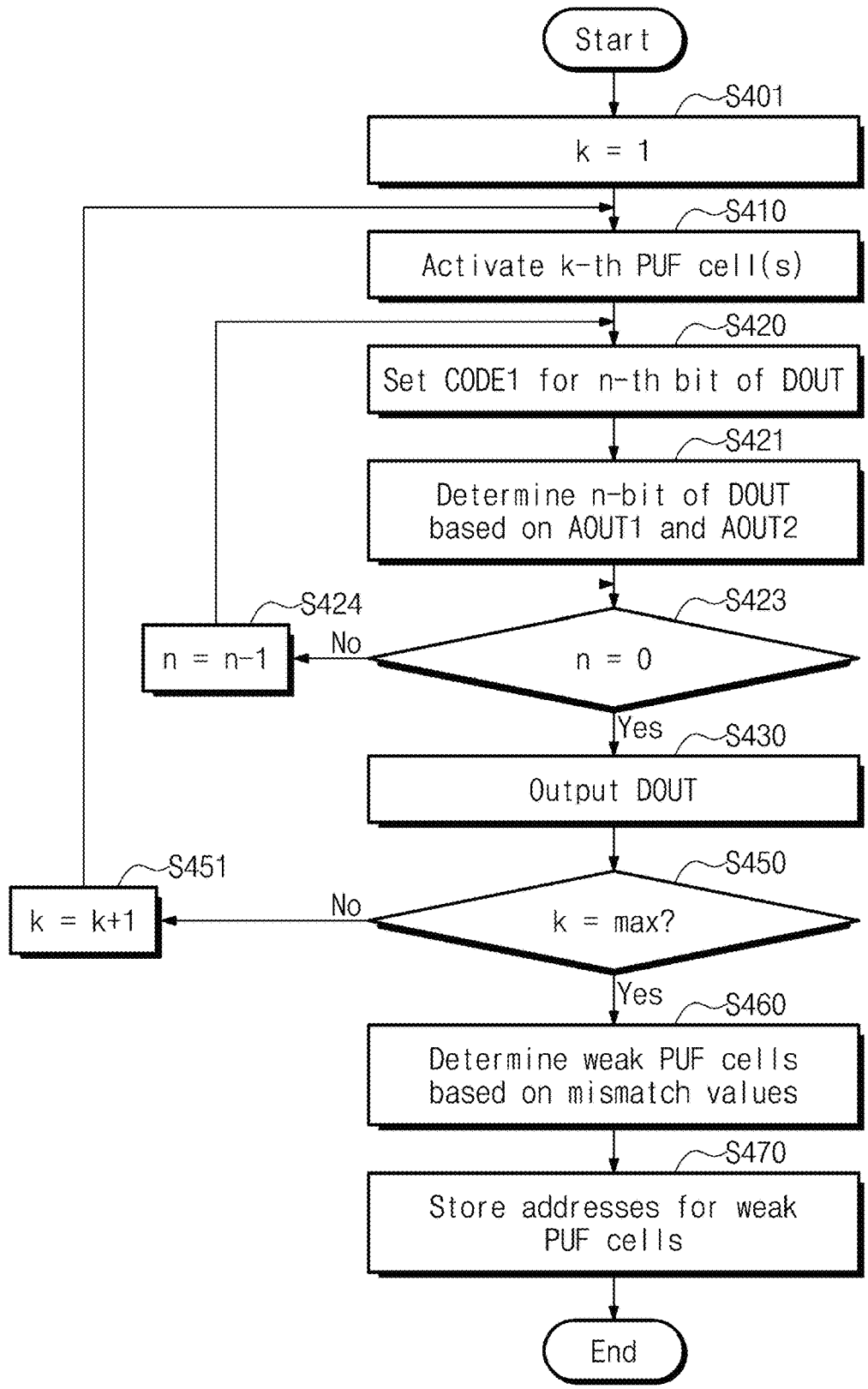
FIG. 16 is a flowchart illustrating an operation of a PUF device of FIG. 15.
Figure 17:
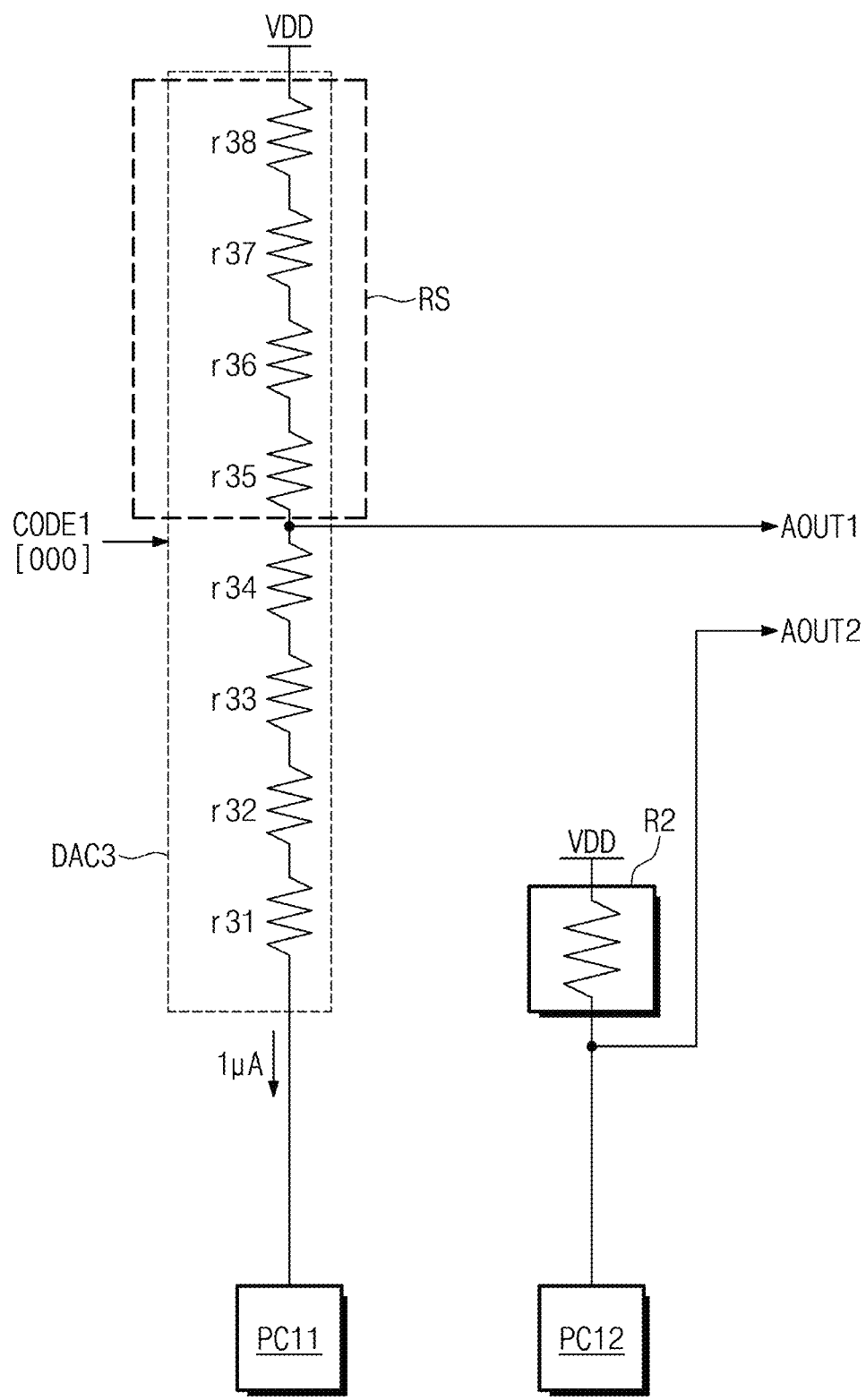
FIG. 17 is a diagram for describing a third digital-to-analog converter of FIG. 15.

FIG. 16 is a flowchart illustrating an operation of a PUF device of FIG. 15. FIG. 17 is a diagram for describing a third digital-to-analog converter of FIG. 15. Referring to FIGS. 15 to 17, the PUF device 400 may perform operation S401 and operation S410. Operation S401 and operation S410 may be similar to operation S301 and operation S310 of FIG. 13, and thus, additional description will be omitted to avoid redundancy.

In operation S420, the PUF device 400 may set the first digital code CODE1 to a value of an n-th bit of the digital output DOUT. In some example embodiments, the value of the n-th bit of the digital output DOUT may be an initial value. In this case, the initial value may be a digital code that is determined such that a terminal corresponding to a resistor string having the same resistance value as the second reference resistor R2 is selected. For example, as illustrated in FIG. 17, the third digital-to-analog converter DAC3 may include a plurality of resistors r31 to r38 connected in series between the power supply voltage VDD and the first data line DL1. In this case, a resistance value of the resistor string RS including some resistors r35 to r38 of the plurality of resistors r31 to r38 may be substantially the same as the resistance value of the second reference resistor R2. In this case, in response to the initial value (e.g., "000") of the first digital code CODE1, the third digital-to-analog converter DAC3 may select a terminal between the resistors r34 and r35 (e.g., a terminal corresponding to the resistor string RS) and may output the first analog output AOUT1. In some example embodiments, afterwards, the terminal corresponding to the first analog output AOUT1 may move toward the power supply voltage VDD or toward the first data line DL1 (or the first PUF cell PC11), depending on the SAR manner.

In operation S421, the PUF device 400 may determine the n-th bit of the digital output DOUT based on the first analog output AOUT1 and the second analog output AOUT2. For example, when the first analog output AOUT1 is greater than the second analog output AOUT2, the n-th bit of the digital output DOUT may be determined as bit "1"; if not, the n-th bit may be determined as bit "0".

In operation S423, whether "n" is "0" (e.g., whether all bits of the digital output DOUT are determined) may be determined. When "n" is not "0," in operation S424, "n" may decrease as much as "1," (e.g., "n−1") and the PUF device 400 may perform operation S420.

For example, in the case wherein the digital output DOUT includes 3 bits the SAR logic circuit 450 may determine the digital output DOUT through three comparison operations.

The first comparison operation: the third digital-to-analog converter DAC3 may select a voltage from a terminal between the resistors r34 and r35 as the first analog output AOUT1 in response to the first digital code CODE1 from the SAR logic circuit 450. In this case, assuming that the first analog output AOUT1 is greater than the second analog output AOUT2, a third bit (e.g., a most significant bit (MSB), high-order bit, and/or left-most bit) of the digital output DOUT may be determined as bit "1."

In the second comparison operation the SAR logic circuit 450 may adjust the first digital code CODE1 in response to a determination that the first analog output AOUT1 is greater than the second analog output AOUT2, and the third digital-to-analog converter DAC3 may output a voltage from a terminal between the resistors r32 and r33 as the first analog output AOUT1 in response to the first digital code CODE1 thus adjusted. In the case that the first analog output AOUT1 is smaller than the second analog output AOUT2, a second bit (e.g., a CSB) of the digital output DOUT may be determined as bit "0".

In the third comparison operation the SAR logic circuit 450 may adjust the first digital code CODE1 in response to that the first analog output AOUT1 is smaller than the second analog output AOUT2, and the third digital-to-analog converter DAC3 may output a voltage from a terminal between the resistors r33 and r34 as the first analog output AOUT1 in response to the first digital code CODE1 thus adjusted. In the case wherein the first analog output AOUT1 is greater than the second analog output AOUT2, a first bit (e.g., a least significant bit (LSB), a low-order bit, and/or right-most bit) of the digital output DOUT may be determined as bit "1".

As a result, the digital output DOUT may be determined through the first to third comparison operations described above. However, the inventive concepts are not limited thereto.

When "n" is "0," in operation S430, the PUF device 400 may output the digital output DOUT. In some example embodiments, the digital signal DOUT may include information about a mismatch value of a target PUF cell. Afterwards, the PUF device 400 may perform operation S450 to operation S470. Operation S450 to operation S470 are similar to operation S150 to operation S170 of FIG. 8, and thus, additional description will be omitted to avoid redundancy.

As described above, according to some example embodiments of the inventive concepts, a PUF device may output a mismatch value of each of a plurality of PUF cells as a digital output by using a digital-to-analog converter. In this case, weak cells of the plurality of PUF cells may be sorted based on the digital output, and an iterative characteristic and reliability of a random key may be improved by excluding and/or discarding the weak cells in generating the random key. In addition, because a DAC of a relatively simple structure is used instead of an ADC, the area and complexity of the PUF device may decrease.

Figure 18:
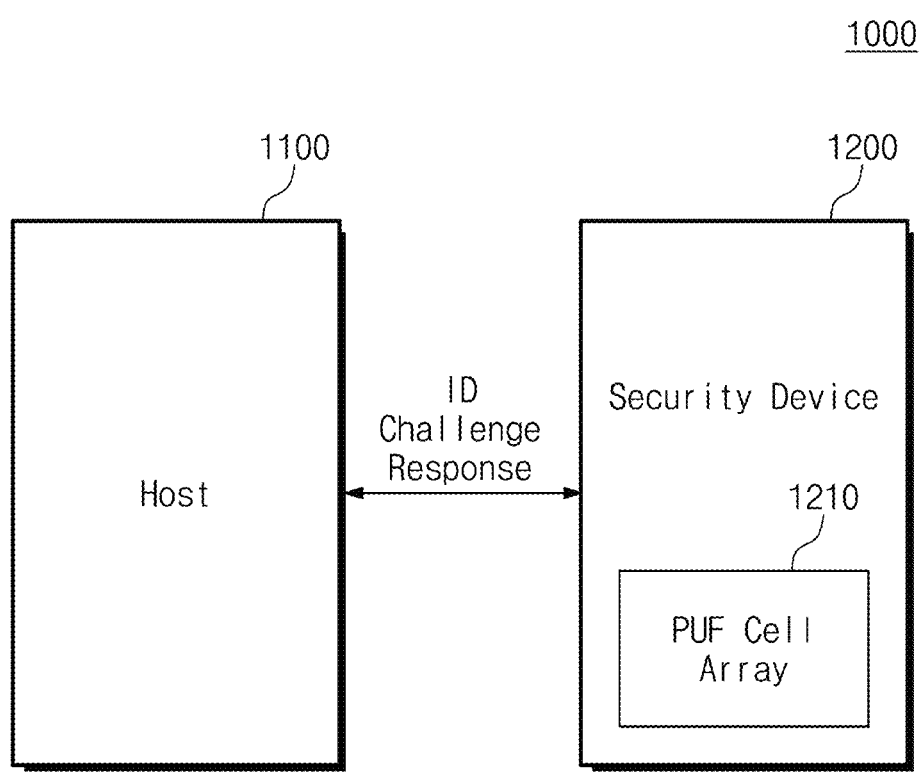
FIG. 18 is a block diagram illustrating an electronic system to which a security device according to some example embodiments of the inventive concepts is applied.

FIG. 18 is a block diagram illustrating an electronic system to which a security device according to some example embodiments of the inventive concepts is applied. Referring to FIG. 18, an electronic system 1000 may include a host 1100 and a security device 1200. The electronic system 1000 may be, for example, an electronic device such as a portable communication terminal, a personal digital assistant (PDA), a portable multimedia player (PMP), a smartphone, a digital camera, a wearable device, and/or the like.

The host 1100 may be configured to control the security device 1200. The security device 1200 may include a PUF cell array 1210 and may be configured to operate under the control of the host 1100. In some example embodiments, the security device 1200 may be a smart card such as an IC card and/or a chip card or may indicate a hardware component separately provided to generate a security key.

For example, the host 1100 may receive a device identifier ID from the security device 1200. The host 1100 may transmit a challenge to the security device 1200 based on the received device identifier ID. The security device 1200 may transmit a response to the host 1100 in response to the challenge from the host 1100. In some example embodiments, the response may be a security key described with reference to FIGS. 1 to 17. For example, depending on the operation method described with reference to FIGS. 1 to 17, the security device 1200 may obtain data, which are based on the challenge from the host 1100, from a plurality of PUF cells included in the PUF cell array 1210; may generate a response (e.g., a PUF key) based on the obtained data; and may transmit the response to the host 1100. The host 1100 may perform an authentication operation on the security device 1200 and/or any other devices based on the received response.

Figure 19:
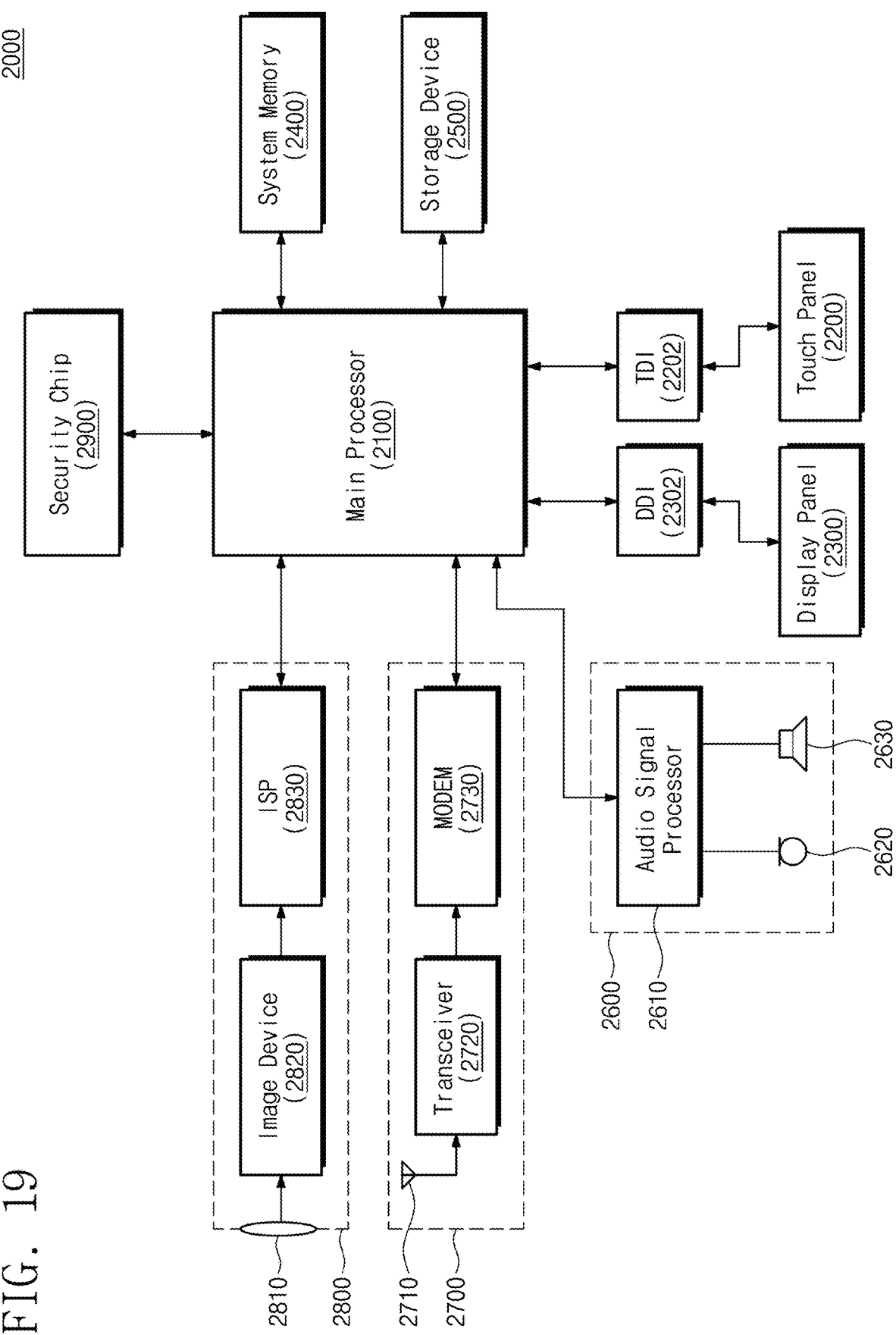
FIG. 19 is a block diagram illustrating an electronic device to which a security device according to some example embodiments the inventive concepts is applied.

FIG. 19 is a block diagram illustrating an electronic device to which a security device according to some example embodiments of the inventive concept is applied. Referring to FIG. 19, an electronic device 2000 may include a main processor 2100, a touch panel 2200, a touch driving integrated circuit 2202, a display panel 2300, a display driving integrated circuit 2302, a system memory 2400, a storage device 2500, an audio processor 2600, a communication block 2700, an image processor 2800, and a security chip 2900. In some example embodiments, the electronic device 2000 may be one of various electronic devices such as a portable communication terminal, a personal digital assistant (PDA), a portable media player (PMP), a digital camera, a smartphone, a tablet computer, a laptop computer, a wearable device, and/or the like.

The main processor 2100 may control overall operations of the electronic device 2000. The main processor 2100 may control/manage operations of the components of the electronic device 2000. The main processor 2100 may process various operations for the purpose of operating the electronic device 2000.

The touch panel 2200 may be configured to sense a touch input from a user under the control of the touch driving integrated circuit 2202. The display panel 2300 may be configured to display image information under the control of the display driving integrated circuit 2302. In some example embodiments, the touch panel 2200 and the display panel 2300 may be included in an integrated device, like a touch screen. In other example embodiments, the touch panel 2200 and the display panel 2300 may be included in different components and may be included, for example, in a key-interface and/or a display screen, respectively.

The system memory 2400 may store data that are used for an operation of the electronic device 2000. The system memory 2400 may include a non-transitory computer readable medium. For example, the system memory 2400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), a ferroelectric RAM (FRAM), and/or a combination thereof. The term "non-transitory," as used herein, is a limitation of the medium itself (e.g., as tangible, and not a signal) as opposed to a limitation on data storage persistency (e.g., RAM vs. ROM).

The storage device 2500 may store data regardless of whether a power is supplied. The system memory 2400 may include a non-transitory computer readable medium. For example, the storage device 2500 may include at least one of various nonvolatile memories such as a flash memory, a PRAM, an MRAM, a ReRAM, a FRAM, and/or the like. For example, the storage device 2500 may include an embedded memory and/or a removable memory of the electronic device 2000.

The audio processor 2600 may process an audio signal by using an audio signal processor 2610. The audio processor 2600 may receive an audio input through a microphone 2620 and/or may provide an audio output through a speaker 2630.

The communication block 2700 may exchange signals with an external device/system through a data connection such as an antenna 2710 and/or a cable connection (not illustrated). A transceiver 2720 and a modulator/demodulator (MODEM) 2730 of the communication block 2700 may process signals exchanged with the external device/system, based on at least one of various communication protocols such as a wireless communication protocol (e.g., long term evolution (LTE), worldwide interoperability for microwave access (WiMax), global system for mobile communication (GSM), code division multiple access (CDMA), Bluetooth, near field communication (NFC), wireless fidelity (Wi-Fi), radio frequency identification (RFID), and/or the like).

The image processor 2800 may receive a light through a lens 2810. An image device 2820 and an image signal processor 2830 included in the image processor 2800 may generate image information about an external object, based on a received light.

The security chip 2900 may be implemented to manage a security operation or an authentication operation associated with the electronic device 2000. In some example embodiments, the security chip 2900 may include a PUF device and/or a security device described with reference to FIGS. 1 to 18.

In some example embodiments, a part of the components of FIG. 19 may be implemented in the form of a system on chip and may be provided as an application processor (AP) of the electronic device 2000.

According to the inventive concepts, a PUF device may determine a mismatch value of each of a plurality of physical unclonable function (PUF) cells by using a digital-to-analog converter. The PUF device may determine a target bit of a target PUF cell by using the digital-to-analog converter. Accordingly, a PUF cell-based security device having improved reliability and reduced circuit complexity and an operation method thereof are provided.

While the inventive concepts have been described with reference to some example embodiments thereof, it will be apparent to those of ordinary skill in the art that various changes and modifications may be made thereto without departing from the spirit and scope of the inventive concepts as set forth in the following claims.

What is claimed is:

1. A security device comprising:
   a physical unclonable function (PUF) cell array including a plurality of PUF cells, connected with a plurality of word lines and a plurality of bit lines;
   first decoder circuitry configured to connect, from the plurality of bit lines, a first bit line connected to a target PUF cell with a first data line and to connect a second bit line connected to a reference PUF cell with a second data line;
   a digital-to-analog converter (DAC) control circuit configured to output a first digital code and a second digital code;
   a first digital-to-analog converter between a power supply voltage source and the first data line, the first digital-to-analog converter configured to generate a first analog output by dividing a first voltage range based on the first digital code, the first voltage range derived from a first voltage of the first data line to the power supply voltage source, the first voltage determined by the target PUF cell;
   a second digital-to-analog converter between the power supply voltage source and the second data line, the second digital-to-analog converter configured to generate a second analog output by dividing a second voltage range based on the second digital code, the second voltage range derived from a second voltage of the second data line to the power supply voltage source, the second voltage determined by, the first voltage determined by the reference PUF cell; and
   a sense amplifier configured to compare the first analog output and the second analog output and output a comparison result,
   wherein, in an initialization operation of the security device, the DAC control circuit is further configured to adjust the first digital code or the second digital code based on the comparison result and to output a digital output based on the adjusted first digital code or the adjusted second digital code.

2. The security device of claim 1, wherein
   the first digital-to-analog converter includes
      a plurality of first resistors connected in series between the power supply voltage source and the first data line,
      a plurality of first terminals between the plurality of first resistors, and
      a first multiplexer configured to, in response the first digital code, select a first terminal of the plurality of first terminals and to connect the selected first terminal with a terminal from which the first analog output is output,
   the second digital-to-analog converter includes
      a plurality of second resistors connected in series between the power supply voltage source and the second data line,
      a plurality of second terminals between the plurality of second resistors, and
      a second multiplexer configured to, in response to the second digital code, select a second terminal of the plurality of second terminals and to connect the selected second terminal with a terminal from which the second analog output is output, and
   a resistance value of each of the plurality of first resistors and a resistance value of each of the plurality of second resistors the same.

3. The security device of claim 1, wherein the digital output includes information about a magnitude of a mismatch value of the target PUF cell.

4. The security device of claim 1, wherein
   when the comparison result corresponds to a first logical value, the DAC control circuit adjusts the second digital code such that the second analog output increases, and
   when the comparison result corresponds to a second logical value, the DAC control circuit adjusts the first digital code such that the first analog output increases.

5. The security device of claim 4, wherein the DAC control circuit adjusts the first digital code or the second digital code based on at least one of a binary code, a Gray code, or a successive approximation register (SAR) manner.

6. The security device of claim 1, wherein, in a normal operation of the security device, the DAC control circuit is further configured to maintain the first digital code and the second digital code at an initial value.

7. The security device of claim 1, wherein
the first decoder circuitry includes a plurality of selectors respectively connected with the plurality of bit lines, and
each of the plurality of selectors is configured to connect a corresponding bit line with at least one of the first data line or the second data line or to disconnect the corresponding bit line from at least one of the first data line or the second data line.

8. The security device of claim 1, further comprising:
second decoder circuitry configured to activate a word line connected with the target PUF cell or the reference PUF cell from among the plurality of word lines.

9. The security device of claim 8, further comprising:
a control logic circuit configured to receive an address from an external device and to control at least one of the first decoder circuitry or the second decoder circuitry in response to the received address.

10. A security device comprising:
a physical unclonable function (PUF) cell array including a plurality of PUF cells connected with a plurality of word lines and a plurality of bit lines;
first decoder circuitry configured to connect a first bit line, of the plurality of bit lines, connected to a target PUF cell with a first data line and to connect a second bit line, of the plurality of bit lines, connected with a reference PUF cell to a second data line;
a digital-to-analog converter (DAC) control circuit configured to output a digital code;
a digital-to-analog converter between a power supply voltage source and the first data line, the digital-to-analog converter configured to generate a first analog output by dividing a first voltage range based on the first digital code, the first voltage range derived from a first voltage of the first data line to the power supply voltage source, the first voltage determined by the target PUF cell;
a reference resistor circuit between the power supply voltage source and the second data line, the reference resistor circuit configured to output a second analog output; and
a sense amplifier configured to compare the first analog output and the second analog output and to output a comparison result,
wherein the DAC control circuit is configured to adjust the digital code in a successive approximation register (SAR) manner, based on the comparison result.

11. The security device of claim 10, wherein the digital-to-analog converter includes:
a plurality of resistors connected in series between the power supply voltage source and the first data line;
a plurality of terminals between the plurality of resistors; and
a multiplexer configured to select one terminal of the plurality of terminals in response to the digital code and to connect the selected one terminal with a terminal from which the first analog output is output.

12. The security device of claim 11, wherein a resistance value of a resistor string including the plurality of resistors is identical to a resistance value of the reference resistor circuit.

13. The security device of claim 10, further comprising:
a control logic circuit configured to control the first decoder circuitry,
wherein, when the comparison result indicates that the first analog output is greater than the second analog output, the DAC control circuit outputs a swap signal, and
wherein the control logic circuit controls the first decoder circuitry, in response to the swap signal, such that the bit line connected with the target PUF cell is swapped to the second data line and the bit line connected with the reference PUF cell swapped to the first data line.

14. An operation method of a security device including a plurality of physical unclonable function (PUF) cells, the method comprising:
connecting a target PUF cell of the plurality of PUF cells with a first data line;
connecting a reference PUF cell of the plurality of PUF cells with a second data line;
setting a first digital code and a second digital code to an initial value;
comparing a first analog output and a second analog output, wherein the first analog output is a voltage obtained by dividing a first voltage range based on the first digital code, the first voltage range being derived from a voltage of the first data line to a power supply voltage, and the second analog output indicates a voltage obtained by dividing a second voltage range based on the second digital code, the second voltage range being derived from a voltage of the second data line to the power supply voltage;
adjusting one digital code of the first digital code or the second digital code based on a comparison result;
determining a mismatch value of the target PUF cell based on the one adjusted digital code from among the first digital code and the second digital code;
determining whether the target PUF cell is a weak cell, based on the mismatch value; and
storing an address corresponding to the target PUF cell when the target PUF cell is determined as the weak cell.

15. The method of claim 14, wherein the initial value is determined such that the first analog output and the second analog output are respectively minimized within the first voltage range and the second voltage range.

16. The method of claim 14, wherein the adjusting of the one digital code of the first digital code and the second digital code based on the comparison result includes:
determining whether the comparison result corresponds to a first logical value or a second logical value;
increasing the second digital code until the comparison result changes to the second logical value when the comparison result corresponds to the first logical value; and
increasing the first digital code until the comparison result changes to the first logical value when the comparison result corresponds to the second logical value.

17. The method of claim 16, wherein,
as the second digital code increases, the second analog output gradually increases as much as a given magnitude, and
as the first digital code increases, the first analog output gradually increases as much as the given magnitude.

* * * * *